United States Patent
Kim et al.

(10) Patent No.: US 10,958,378 B2
(45) Date of Patent: Mar. 23, 2021

(54) METHOD FOR COMMUNICATION APPARATUS PROCESSING AN IN-BAND EMISSION INTERFERENCE SIGNAL WHEN THE COMMUNICATION APPARATUS OPERATING IN FDR MODE TRANCEIVES SIGNALS USING FDM MANNER

(71) Applicant: LG ELECTRONICS INC., Seoul (KR)

(72) Inventors: Dongkyu Kim, Seoul (KR); Woochan Kim, Seoul (KR); Sangrim Lee, Seoul (KR); Hojae Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/937,115

(22) Filed: Mar. 27, 2018

(65) Prior Publication Data

US 2018/0287739 A1 Oct. 4, 2018

Related U.S. Application Data

(60) Provisional application No. 62/477,439, filed on Mar. 28, 2017.

(51) Int. Cl.
| | |
|---|---|
| H04W 74/04 | (2009.01) |
| H04L 1/00 | (2006.01) |
| H04L 5/14 | (2006.01) |
| H04L 5/00 | (2006.01) |
| H04J 11/00 | (2006.01) |

(Continued)

(52) U.S. Cl.
CPC ........... *H04L 1/0068* (2013.01); *H04B 1/525* (2013.01); *H04J 11/0023* (2013.01); *H04L 5/0092* (2013.01); *H04L 5/143* (2013.01); *H04L 27/2602* (2013.01); *H04B 7/0413* (2013.01); *H04J 2011/0009* (2013.01); *H04J 2211/005* (2013.01); *H04J 2211/006* (2013.01);

(Continued)

(58) Field of Classification Search
CPC . H04L 1/0068; H04L 27/2602; H04L 5/0092; H04L 5/143; H04L 27/2611; H04L 27/2636; H04B 1/525; H04B 7/0413; H04J 11/0023; H04J 2211/006; H04J 2211/005; H04J 2011/0009
See application file for complete search history.

(56) References Cited

U.S. PATENT DOCUMENTS

| | | | | |
|---|---|---|---|---|
| 2015/0109932 | A1* | 4/2015 | Goldhamer | H04W 72/0453 370/236 |
| 2017/0208592 | A1* | 7/2017 | Rico Alvarino | H04W 4/70 |

(Continued)

*Primary Examiner* — Lakeram Jangbahadur
(74) *Attorney, Agent, or Firm* — Dentons US LLP

(57) ABSTRACT

A method for a base station processing an in-band emission interference signal caused when the base station operating in a Full Duplex Radio (FDR) mode transceives signals using a Frequency Division Multiplexing (FDM) manner includes transmitting a downlink signal in a flexible downlink duration of an uplink band; and processing the in-band emission interference signal caused by transmission of the downlink signal in an uplink duration of the uplink band, wherein the processing of the in-band emission interference signal is performed by puncturing a corresponding resource of the uplink duration, wherein the resource on the downlink signal is transmitted is mirrored to the corresponding resource of the uplink duration from a Direct Current (DC) subcarrier as a reference.

10 Claims, 21 Drawing Sheets

(51) Int. Cl.
*H04L 27/26* (2006.01)
*H04B 1/525* (2015.01)
*H04B 7/0413* (2017.01)

(52) U.S. Cl.
CPC ......... *H04L 5/0048* (2013.01); *H04L 27/2611* (2013.01); *H04L 27/2636* (2013.01)

(56) References Cited

U.S. PATENT DOCUMENTS

| | | | | |
|---|---|---|---|---|
| 2018/0035459 A1* | 2/2018 | Islam | ................ | H04W 74/04 |
| 2018/0191545 A1* | 7/2018 | Liu | ................ | H04L 41/00 |
| 2018/0242305 A1* | 8/2018 | Kim | ................ | H04L 5/14 |
| 2018/0302254 A1* | 10/2018 | Yamada | ................ | H04L 5/0053 |
| 2019/0335359 A1* | 10/2019 | Moroga | ................ | H04W 52/16 |

* cited by examiner (a) paired spectrum (b) un-paired spectrum

METHOD FOR COMMUNICATION APPARATUS PROCESSING AN IN-BAND EMISSION INTERFERENCE SIGNAL WHEN THE COMMUNICATION APPARATUS OPERATING IN FDR MODE TRANCEIVES SIGNALS USING FDM MANNER

This application claims the benefit of U.S. Provisional Application No. 62/477,439, filed on Mar. 28, 2017, which is hereby incorporated by reference as if fully set forth herein.

BACKGROUND OF THE INVENTION

Field of the Invention

The present invention relates to wireless communication and, more particularly, to a method of processing an interference signal caused by in-band emission during signal transmission and reception of a communication device operating in a Full Duplex Radio (FDR) mode in a Frequency Division Multiplexing (FDM) manner.

Discussion of the Related Art

Compared to conventional half duplex communication in which time or frequency resources are divided orthogonally, full duplex communication doubles a system capacity in theory by allowing a node to perform transmission and reception simultaneously.

FIG. 1 is a conceptual view of a UE and a Base Station (BS) which support Full Duplex Radio (FDR).

In the FDR situation illustrated in FIG. 1, the following three types of interference are produced.

Intra-device self-interference: Because transmission and reception take place in the same time and frequency resources, a desired signal and a signal transmitted from a BS or UE are received at the same time at the BS or UE. The transmitted signal is received with almost no attenuation at a Reception (Rx) antenna of the BS or UE, and thus with much larger power than the desired signal. As a result, the transmitted signal serves as interference.

UE to UE inter-link interference: An Uplink (UL) signal transmitted by a UE is received at an adjacent UE and thus serves as interference.

BS to BS inter-link interference: The BS to BS inter-link interference refers to interference caused by signals that are transmitted between BSs or heterogeneous BSs (pico, femto, and relay) in a HetNet state and received by an Rx antenna of another BS.

SUMMARY OF THE INVENTION

An object of the present invention is to provide a method of processing an in-band emission interference signal when a base station (BS) operating in an FDR mode transceives signals using an FDM manner.

Another object of the present invention is to provide a method for a UE to support processing of an in-band emission interference signal when a base station (BS) which transceives signals in an FDM manner.

Another object of the present invention is to provide a base station (BS) of an FDR mode for processing an in-band emission interference signal when the BS transceives signals using an FDM manner.

Another object of the present invention is to provide a UE for supporting processing of an in-band emission interference signal when a base station (BS) transceives signals using an FDM manner.

The technical objects that can be achieved through the present invention are not limited to what has been particularly described hereinabove and other technical objects not described herein will be more clearly understood by persons skilled in the art from the following detailed description.

To achieve these objects and other advantages and in accordance with the purpose of the invention, as embodied and broadly described herein, a method for a base station processing an in-band emission interference signal when a base station operates in a Full Duplex Radio (FDR) mode transceiver signals in a Frequency Division Multiplexing (FDM) manner, includes transmitting a downlink signal in a flexible downlink duration of an uplink band and processing the in-band emission interference signal caused by transmission of the downlink signal in an uplink duration of the uplink band, wherein the processing of the in-band emission interference signal is performed by puncturing a corresponding resource in the uplink duration, wherein the resource on the downlink signal is transmitted is mirrored to the corresponding resource of the uplink duration from a Direct Current (DC) subcarrier as a reference.

The processing of the in-band emission interference signal may include estimating a channel gain of the in-band emission interference signal or acquiring information about the in-band emission interference signal. The method may further include transmitting information about the corresponding resource of the uplink duration mirrored by the resource, to a user equipment.

The estimating of the channel gain of the in-band emission interference signal or the acquiring of the information of the in-band emission interference signal may include puncturing the corresponding resource of the uplink duration mirrored by the resource.

The estimating the channel gain of the interference signal or the acquiring the information of the interference signal may be performed on the punctured corresponding resource. The flexible downlink duration and the uplink duration may be configured in an uplink band in the FDM manner and the flexible downlink duration may be flexibly configured in the uplink band.

In another aspect of the present invention, a method for a user equipment processing an in-band emission interference signal when a base station transceiver signals in a Frequency Division Multiplexing (FDM) manner includes receiving control information instructing puncturing of a corresponding resource in an uplink duration of an uplink band from the base station operating in a Full Duplex Radio (FDR) mode and performing puncturing the corresponding resource of the uplink duration of the uplink band based on the control information, wherein the in-band emission interference signal is caused by transmission of a downlink signal in a flexible downlink duration of the uplink band, and wherein a resource on the downlink signal is transmitted is mirrored to the resource of the uplink duration from a Direct Current (DC) subcarrier as a reference.

The flexible downlink duration and the uplink duration may be configured in an uplink band in the FDM manner and the flexible downlink duration may be flexibly configured in the uplink band.

In another aspect of the present invention, a base station of a Full Duplex Radio (FDR) mode for processing an in-band emission interference signal when the base station transceiver signals using a Frequency Division Multiplexing (FDM) manner includes a transmitter configured to transmit a downlink signal in a flexible downlink duration of an uplink band and a processor configured to process the in-band emission interference signal caused by transmission of the downlink signal in an uplink duration of the uplink band, wherein the processor is configured to process the in-band emission interference signal for a corresponding resource of the uplink duration, wherein the resource on the downlink signal is transmitted is mirrored to the corresponding resource of the uplink duration from a Direct Current (DC) subcarrier as a reference.

The transmitter may be configured to transmit information about the corresponding resource in the uplink duration mirrored by the resource, to a user equipment. The flexible downlink duration and the uplink duration may be configured in an uplink band in the FDM manner and the flexible downlink duration may be flexibly configured in the uplink band.

In another aspect of the present invention, a user equipment for supporting processing of an interference signal caused by in-band emission when a base station transceives signals in a Frequency Division Multiplexing (FDM) manner, includes a receiver configured to receive control information instructing puncturing a resource of an uplink duration from the base station operating in a Full Duplex Radio (FDR) mode and a processor configured to perform puncturing the resource of the uplink duration based on the control information, wherein the resource of the uplink duration corresponds to an uplink resource mirrored based on a Direct Current (DC) subcarrier by a resource on which a downlink signal is transmitted in a flexible downlink duration.

The flexible downlink duration and the uplink duration may be configured in an uplink band in the FDM manner and the flexible downlink duration may be flexibly configured in the uplink band.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention, illustrate embodiments of the invention and together with the description serve to explain the principle of the invention.

DETAILED DESCRIPTION OF THE INVENTION

Figure 1:
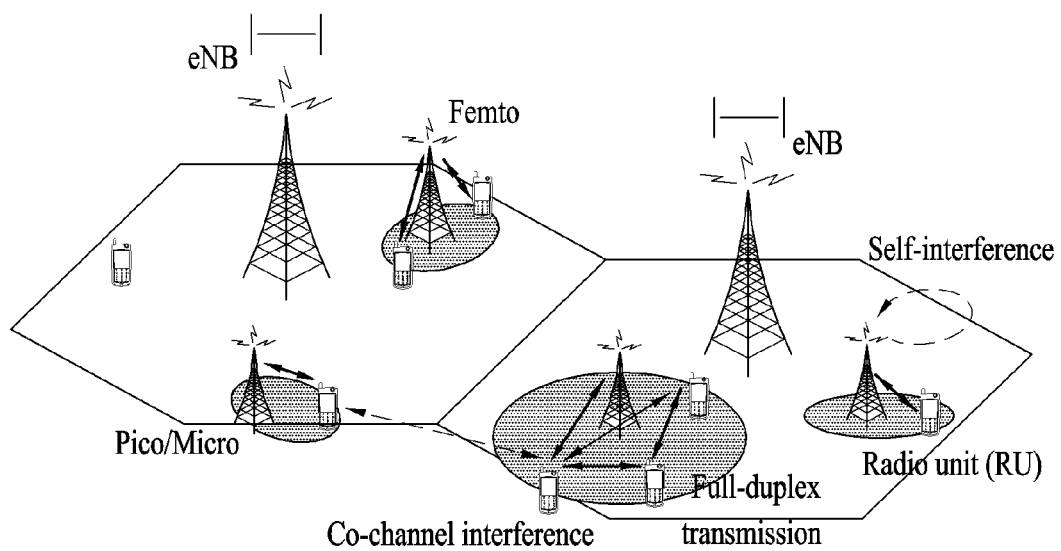
FIG. 1 is a diagram illustrating a network supporting a full-duplex/half-duplex communication operation scheme of a UE, which is proposed in the present invention.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like. Although the present specification is described based on IEEE 802.16m system, contents of the present invention may be applicable to various kinds of other communication systems.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

The following descriptions are usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented by such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE employs OFDMA in DL and SC-FDMA in UL. And, LTE-A (LTE-Advanced) is an evolved version of 3GPP LTE.

Moreover, in the following description, specific terminologies are provided to help the understanding of the present invention. And, the use of the specific terminology can be modified into another form within the scope of the technical idea of the present invention.

Figure 2:
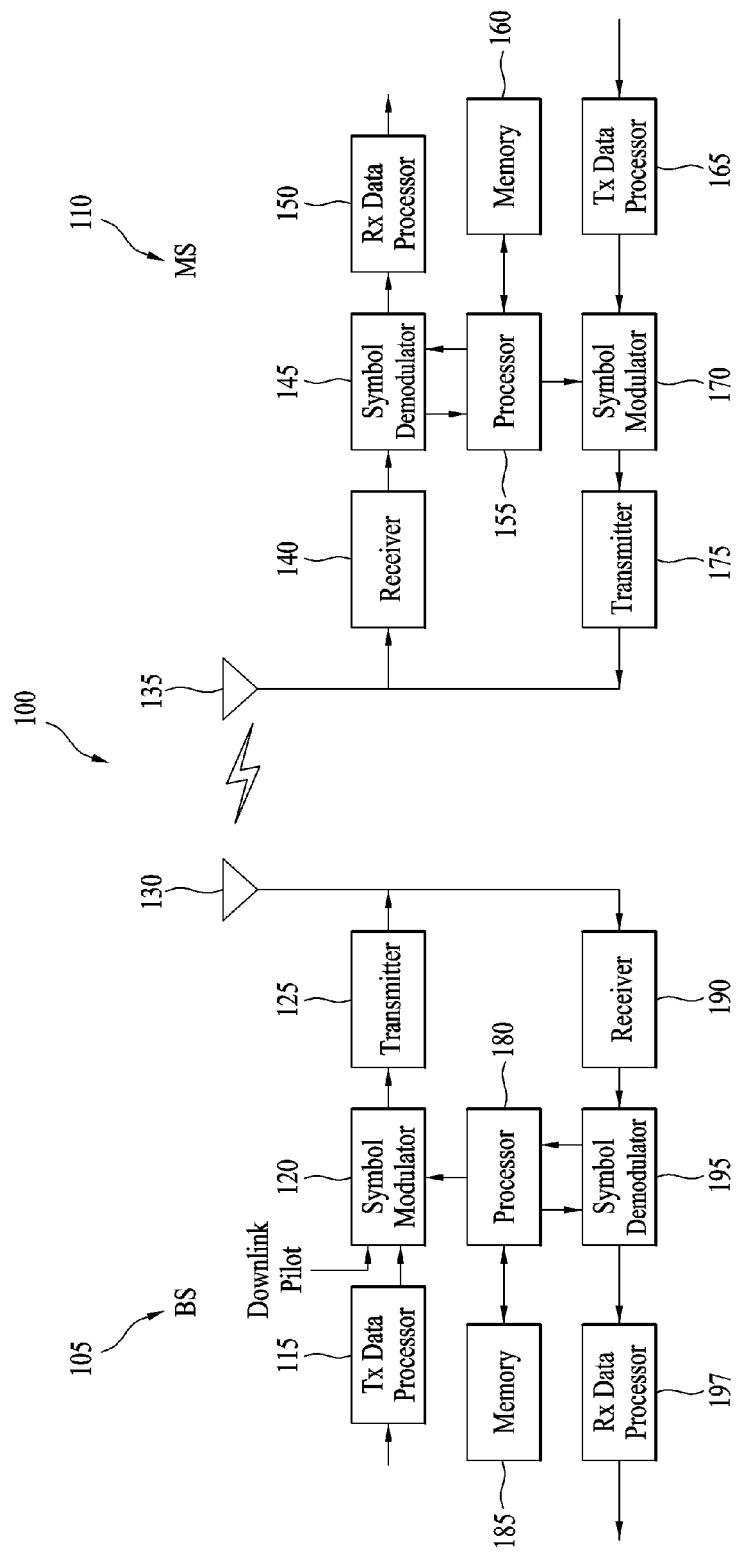
FIG. 2 is a block diagram of configurations of a base station 105 and a user equipment 110 in a wireless communication system 100.

FIG. 2 is a block diagram for configurations of a base station 105 and a user equipment 110 in a wireless communication system 100.

Although one base station 105 and one user equipment 110 (D2D user equipment included) are shown in the drawing to schematically represent a wireless communication system 100, the wireless communication system 100 may include at least one base station and/or at least one user equipment.

Referring to FIG. 2, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present invention supports an MIMO (multiple input multiple output) system. And, the base station 105 according to the present invention may support both SU-MIMO (single user-MIMO) and MU-MIMO (multi user-MIMO) systems.

In downlink, the transmitted data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmitted data processor 115 in the base station 105, respectively.

In the user equipment 110 in uplink, the transmitted data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present invention as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

Figure 3:
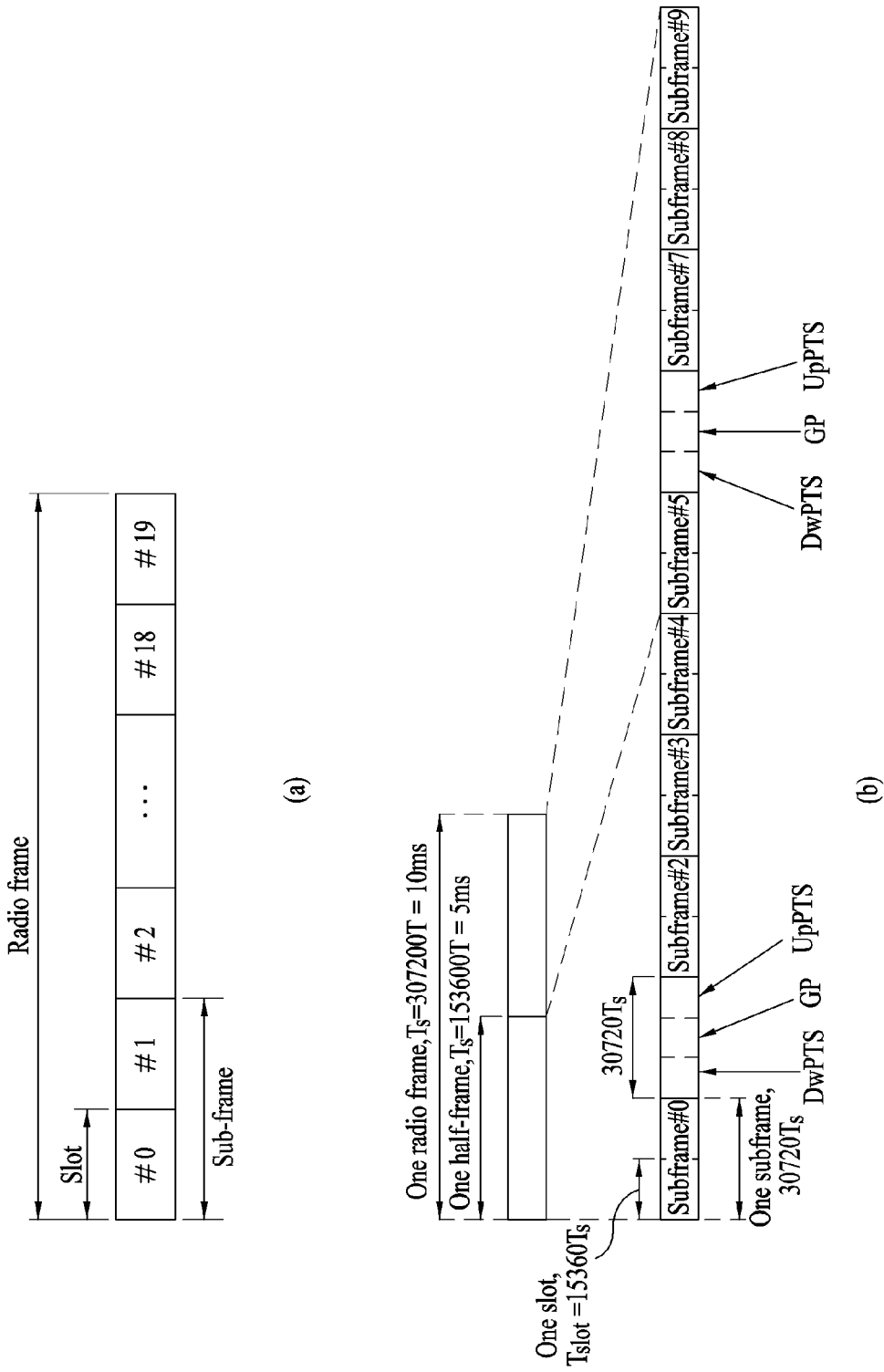
FIG. 3 is a diagram illustrating the structure of a radio frame used in a 3GPP LTE/LTE-A system as an exemplary wireless communication system.

FIG. 3 illustrates a radio frame structure used in a 3GPP LTE/LTE-A system as an exemplary wireless communication system.

As general wireless transmission, in wireless transmission between a BS and a wireless terminal as wireless devices, wireless transmission from the BS to the wireless terminal is referred to as downlink transmission and transmission from the wireless terminal to the BS is referred to as uplink transmission. A scheme for distinguishing between wireless resources of downlink transmission and uplink transmission is defined as "duplex". Dividing a frequency band into a downlink transmission band and an uplink transmission band and performing bidirectional transmission is referred to as Frequency Division Duplex (FDD) and dividing time-domain wireless resources into downlink time duration resources and uplink time duration resources in the same frequency band and performing transmission and reception is referred to as Time Division Duplex (TDD).

In a cellular OFDM wireless packet communication system, uplink/downlink data packets are transmitted in subframes. One subframe is defined as a predetermined time interval including a plurality of OFDM symbols. The 3GPP LTE standard supports the structure of a type 1 radio frame applicable to FDD and the structure of a type 2 radio frame applicable to TDD.

(a) FIG. 3 illustrates the structure of the type 1 radio frame. A downlink (DL) radio frame includes 10 subframes, each subframe including two slots in the time domain. A time required to transmit one subframe is defined as a Transmission Time Interval (TTI). For example, one subframe may be 1 ms long and one slot may be 0.5 ms long. One slot includes a plurality of OFDM symbols in the time domain and a plurality of Resource Blocks (RBs) in the frequency domain. Since 3GPP LTE uses OFDMA for DL, an OFDM symbol is one symbol period. The OFDM symbol may be called an SC-FDMA symbol or symbol period. An RB is a resource allocation unit including a plurality of contiguous subcarriers in one slot.

The number of OFDM symbols included in one slot may be changed according to the configuration of a Cyclic Prefix (CP). There are two types of CPs, extended CP and normal CP. For example, if each OFDM symbol is configured to include a normal CP, one slot may include 7 OFDM symbols. If each OFDM symbol is configured to include an extended CP, the length of an OFDM symbol is increased and thus the number of OFDM symbols included in one slot is less than that in the case of a normal CP. In the case of the extended CP, for example, one slot may include 6 OFDM symbols. If a channel state is unstable, as is the case when the UE moves at high speed, the extended CP may be used in order to further reduce inter-symbol interference.

When the normal CP is used, since one slot includes 7 OFDM symbols, one subframe includes 14 OFDM symbols. Up to the first three OFDM symbols of each subframe may be allocated to a Physical Downlink Control Channel (PDCCH) and the remaining OFDM symbols may be allocated to a Physical Downlink Shared Channel (PDSCH).

(b) of FIG. 3 illustrates the structure of the type 2 radio frame.

The type 2 radio frame includes two half-frames, each half-frame including five subframes, a Downlink Pilot Time Slot (DwPTS), a Guard Period (GP), and an Uplink Pilot Time Slot (UpPTS). One subframe includes two slots. DwPTS is used for initial cell search, synchronization, or channel estimation at a UE and UpPTS is used for channel estimation and Uplink (UL) transmission synchronization with a UE at a BS. GP is used to cancel UL interference between UL and DL, caused by multi-path delay of a DL signal.

Each half-frame includes 5 subframes. A subframe indicated by "D" is a subframe for DL transmission, a subframe indicated by "U" is a subframe for UL transmission, and a subframe indicated by "S" is a special subframe including a DwPTS, a GP, and a UpPTS. DwPTS is used for initial cell search, synchronization, or channel estimation at a UE and UpPTS is used for channel estimation and UL transmission synchronization with a UE at a BS. GP is used to cancel UL interference between UL and DL, caused by multi-path delay of a DL signal.

If a DL-UL switch-point periodicity is 5 ms, the special subframe S exists in every half-frame and if the DL-UL switch-point periodicity is 10 ms, the special subframe S exists only in the first half-frame. Subframe indexes 0 and 5 and the DwPTS are used for DL transmission. The UpPTS and a subframe following the special subframe are always used for UL transmission. If multiple cells are aggregated, it may be assumed that a UE has the same UL-DL configuration over all cells and GPs of special subframes in different cells overlap during at least 1456 Ts. The structure of the radio frame is purely exemplary and the number of subframes included in a radio frame, the number of slots included in a subframe, or the number of symbols included in a slot may be changed in various manners.

Table 1 shows a special frame configuration (the length of DwPTS/GP/UpPTS).

Referring to Table 2, in the 3GPP LTE system, 7 UL-DL configurations are present in the type 2 frame structure. The position and number of each of a DL subframe, a special subframe, and a UL subframe may differ according to each configuration. Hereinafter, various embodiments of the present invention will be described based on the UL-DL configurations of the type 2 frame structure shown in Table 2. Table 3 shows values of k for TDD configurations 0 to 6.

TABLE 3

| TDD UL/DL Configuration | subframe number i | | | | | | | | | |
|---|---|---|---|---|---|---|---|---|---|---|
| | 0 | 1 | 2 | 3 | 4 | 5 | 6 | 7 | 8 | 9 |
| 0 | | 7 | 4 | | | | 7 | 4 | | |
| 1 | | | 4 | | | 6 | | | 4 | 6 |
| 2 | | | | 6 | | | | | 6 | |
| 3 | | 6 | | | | | | | 6 | 6 |
| 4 | | | | | | | | | 6 | 6 |
| 5 | | | | | | | | | 6 | |
| 6 | | 6 | 4 | | | | 7 | 4 | | 6 |

For a type 1 frame structure, a HARQ-ACK received on a PHICH assigned to a UE in subframe I is associated with

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

Table 2 lists UL-DL configurations in the type 2 frame structure in a 3GPP LTE system.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

PUSCH transmission in subframe i-4. For UL-DL configurations 1 to 6 of the type 2 frame structure, a HARQ-ACK received on the PHICH assigned to the UE in subframe I is associated with PUSCH transmission in subframe i-k (where k is indicated in Table 3).

Hereinbelow, a HARQ-ACK procedure of the UE in the 3GPP LTE/LTE-A system will be described in brief. The present invention will be described based on the HARQ-ACK procedure of the UE in the 3GPP LTE/LTE-A system.

TABLE 4

For Frame Structure type 2 UL/DL configuration 1-6, a HARQ-ACK received on the PHICH assigned to a UE in subframe i is associated with PUSCH transmission in the subframe i-k as indicated by Table 3.
For Frame Structure type 2 UL/DL configuration 0, a HARQ-ACK received on the PHICH in the resource corresponding to IPHICH = 0, assigned to a UE in subframe i is associated with PUSCH transmission in the subframe i-k as indicated by the table 3. If,

TABLE 4-continued for Frame Structure type 2 UL/DL configuration 0, a HARQ-ACK received on the
PHICH in the resource corresponding to IPHICH = 1, assigned to a UE in subframe i is
associated with PUSCH transmission in the subframe i-6.
The physical layer in the UE shall deliver indications to the higher layers as follows:
For downlink subframe i, if a transport block was transmitted in the associated PUSCH
subframe then:
    if ACK is decoded on the PHICH corresponding to the transport block in
subframe i, ACK for that transport block shall be delivered to higher layers;
        else NACK for that transport block shall be delivered to higher layers.
For downlink subframe i, in case of retransmission in the associated PUSCH subframe,
if a transport block was disabled in the associated PUSCH subframe then ACK for that
transport block shall be delivered to the higher layers.

A PHICH assignment procedure in the 3GPP LTE/LTE-A system will be briefly described hereinbelow. The present will be described based on the PHICH assignment procedure in the 3GPP LTE/LTE-A system.

TABLE 5

For PUSCH transmissions scheduled from serving cell in subframe n, a UE shall determine the
corresponding PHICH resource of serving cell c in subframe n + kPHICH, where kPHICH is always 4 for
FDD and is given in following table 6 for TDD. For subframe bundling operation, the corresponding
PHICH resource is associated with the last subframe in the bundle.
The PHICH resource is identified by the index pair $(n_{PHICH}^{group}, n_{PHICH}^{seq})$ where $n_{PHICH}^{group}$ is the
PHICH group number and $n_{PHICH}^{seq}$ is the orthogonal sequence index within the group as defined by:

$$n_{PHICH}^{group} = (I_{PRB\_RA} + n_{DMRS}) \bmod N_{PHICH}^{group} + I_{PHICH} N_{PHICH}^{group}$$
$$n_{PHICH}^{seq} = (\lfloor I_{PRB\_RA} / N_{PHICH}^{group} \rfloor + n_{DMRS}) \bmod 2 N_{SF}^{PHICH}$$

where
nDMRS is mapped from the cyclic shift for DMRS field (according to following table 6) in the most recent
PDCCH with uplink DCI format [4] for the transport block(s) associated with the corresponding PUSCH
transmission. nDMRS shall be set to zero, if there is no PDCCH with uplink DCI format for the same
transport block, and if the initial PUSCH for the same transport block is semi-persistently scheduled, or
if the initial PUSCH for the same transport block is scheduled by the random access response grant.
    $N_{SF}^{PHICH}$ is the spreading factor size used for PHICH modulation as described in section 6.9.1 in [3].

$$I_{PRB\_RA} = \begin{cases} I_{PRB\_RA}^{lowest\_index} & \text{for the first TB of a PUSCH with associated PDCCH or for the ease of no associated PDCCH when the number of negatively acknowledged TBs is not equal to the number of TBs indicated in the most recent PDCCH associated with the corresponding PUSCH} \\ I_{PRB\_RA}^{lowest\_index} + 1 & \text{for a second TB of a PUSCH with associated PDCCH} \end{cases}$$

where $I_{PRB\_RA}^{lowest\_index}$ is the lowest PRB index in the first slot of the corresponding PUSCH transmission,
$N_{PHICH}^{group}$ is the number of PHICH groups configured by higher layers as described in section 6.9 of [3], $$I_{PHICH} = \begin{cases} 1 & \text{for TDD UL/DL configuration 0 with PUSCH transmission in subframe } n = 4 \text{ or } 9 \\ 0 & \text{otherwise} \end{cases}$$

TABLE 6

| TDD UL/DL Configuration | subframe index n | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | | 4 | 7 |

Figure 4:
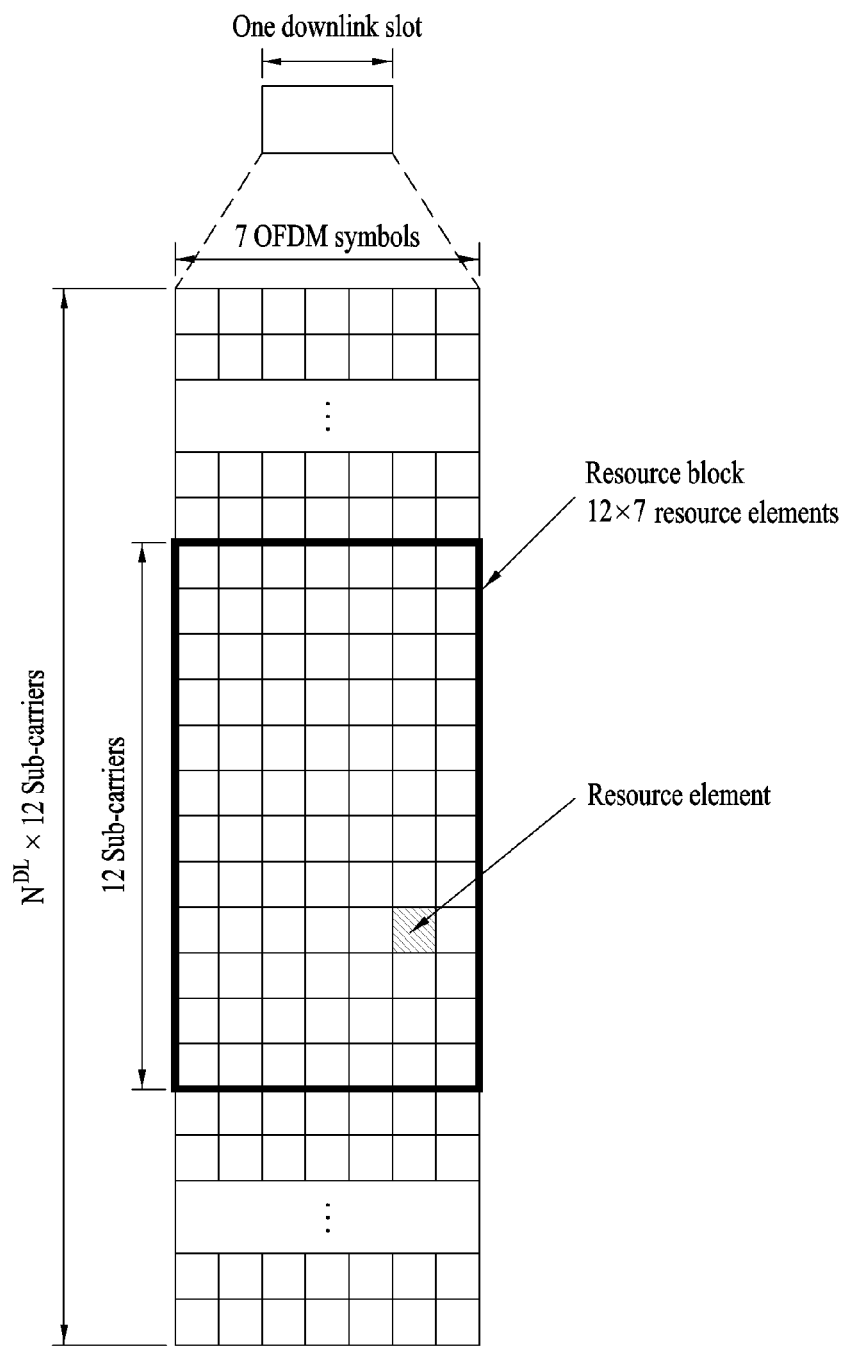
FIG. 4 is a diagram illustrating a resource grid of a downlink slot of a 3GPP LTE/LTE-A system as an exemplary wireless communication system.

FIG. 4 is a diagram illustrating a resource grid of a DL slot of a 3GPP LTE/LTE-A system as an exemplary wireless communication system.

Referring to FIG. 4, a DL slot includes a plurality of OFDM symbols in the time domain. One DL slot may include 7 (or 6) OFDM symbols and one RB may include 12 subcarriers in the frequency domain. Each element on the resource grid is referred to as a Resource Element (RE). One RB includes 12×7 (or 6) REs. The number of RBs, NRB, included in a DL slot depends on a DL transmission bandwidth. The structure of a UL slot is the same as the structure of a DL slot except that an OFDM symbol is replaced with an SC-TDMA symbol.

Figure 5:
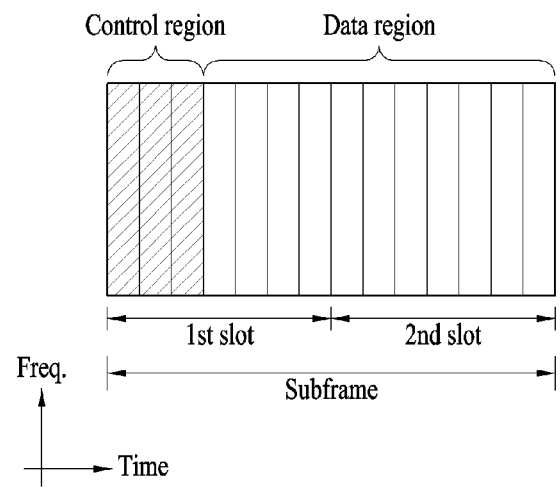
FIG. 5 is a diagram illustrating the structure of a downlink subframe used in a 3GPP LTE/LTE-A system as an exemplary wireless communication system.

FIG. 5 illustrates the structure of a DL subframe used in a 3GPP LTE/LTE-A system as an exemplary wireless communication system.

Referring to FIG. 5, up to three (or four) OFDM symbols at the start of the first slot of a subframe are used as a control region to which control channels are allocated and the remaining OFDM symbols of the subframe are used as a data region to which a PDSCH is allocated. DL control channels defined for LTE include a Physical Control Format Indicator Channel (PCFICH), a PDCCH, and a Physical Hybrid ARQ Indicator Channel (PHICH). The PCFICH is transmitted in the first OFDM symbol of a subframe, carrying information about the number of OFDM symbols used for transmission of control channels in the subframe. The PHICH delivers a Hybrid Automatic Repeat reQuest (HARQ) Acknowledgement/Negative Acknowledgement (ACK/NACK) signal as a response to UL transmission.

Control information carried on the PDCCH is called Downlink Control Information (DCI). Format 0 for UL and formats 1, 1A, 1B, 1C, 1D, 2, 2A, 3, and 3A for DL are defined as DCI formats. The DCI formats selectively include information such as a hopping flag, RB allocation, a Modulation and Coding Scheme (MCS), a Redundancy Version (RV), a New Data Indicator (NDI), Transmit Power Control (TPC), a cyclic shift, a Demodulation Reference Signal (DM RS), Channel Quality Information (CQI) request, a HARQ process number, a Transmitted Precoding Matrix Indicator (TPMI), and Precoding Matrix Indicator (PMI) confirmation, according to usage.

The PDCCH delivers information about a transport format and resource allocation for a Downlink Shared channel (DL-SCH), information about a transport format and resource allocation for an Uplink Shared Channel (UL-SCH), paging information of a Paging Channel (PCH), system information on the DL-SCH, information about resource allocation for a higher-layer control message such as a random access response transmitted on the PDSCH, a set of Tx power control commands for individual UEs of a UE group, Tx power control commands, Voice Over Internet Protocol (VoIP) activation indication information, etc. A plurality of PDCCHs may be transmitted in the control region. A UE may monitor a plurality of PDCCHs. A PDCCH is transmitted on an aggregate of one or plural consecutive Control Channel Elements (CCEs). A CCE is a logical allocation unit used to provide the PDCCH at a coding rate based on the state of a radio channel. The CCE includes a plurality of Resource Element Groups (REGs). The format of the PDCCH and the number of available bits for the PDCCH are determined according to the number of CCEs. A BS determines the PDCCH format according to DCI which is to be transmitted to a UE and attaches a Cyclic Redundancy Check (CRC) to control information. The CRC is masked by an identifier (ID) (e.g., a Radio Network Temporary Identifier (RNTI)) according to the owner or usage purpose of the PDCCH. If the PDCCH is destined for a specific UE, the CRC may be masked by a Cell-RNTI (C-RNTI) of the UE. If the PDCCH carries a paging message, the CRC thereof may be masked by a paging ID (e.g., a Paging-RNTI (P-RNTI)). If the PDCCH carries system information (particularly, a System Information Block (SIB)), the CRC thereof may be masked by a System Information RNTI (SI-RNTI). If the PDCCH is designated as a random access response, the CRC thereof may be masked by a Random Access-RNTI (RA-RNTI).

Figure 6:
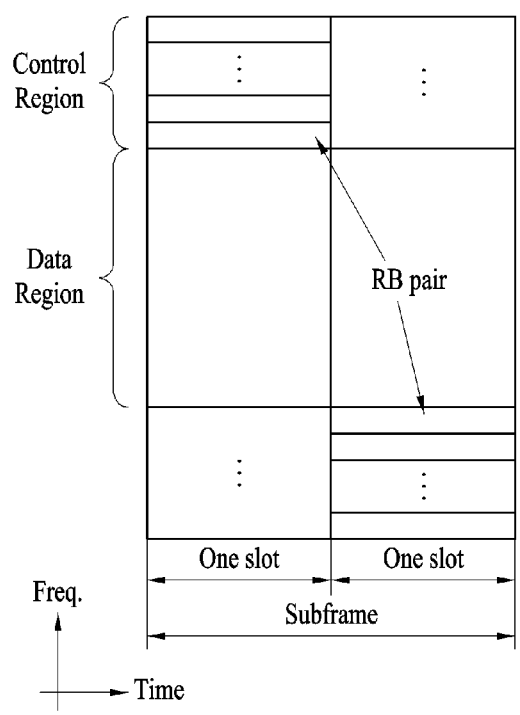
FIG. 6 is a diagram illustrating the structure of an uplink subframe used in a 3GPP LTE/LTE-A system as an exemplary wireless communication system.

FIG. 6 illustrates the structure of a UL subframe used in a 3GPP LTE/LTE-A system as an exemplary wireless communication system.

Referring to FIG. 6, a UL subframe includes a plurality of slots (e.g. 2 slots). A slot may include a different number of SC-FDMA symbols according to CP length. The UL subframe is divided into a control region and a data region in the frequency domain. The data region includes a PUSCH to transmit a data signal such as voice and the control region includes a PUCCH to transmit Uplink Control Information (UCI). The PUCCH occupies a pair of RBs at both ends of the data region in the frequency domain and the RB pair frequency-hops over a slot boundary.

The PUCCH may be used to deliver the following control information.

SR (Scheduling Request): SR is information requesting UL-SCH resources and is transmitted using On-Off Keying (OOK).

HARQ ACK/NACK: HARQ ACK/NACK is a response signal to a DL data packet received on a PDSCH, indicating whether the DL data packet has been successfully received. 1-bit ACK/NACK is transmitted as a response to a single DL codeword (CW) and 2-bit ACK/NACK is transmitted as a response to two DL CWs.

CQI (Channel Quality Indicator): CQI is feedback information regarding a DL channel Multiple Input Multiple Output (MIMO)-related feedback information includes a Rank Indicator (RI), a Precoding Matrix Indicator (PMI), a Precoding Type Indicator (PTI), etc. The CQI occupies 20 bits per subframe.

The amount of UCI that the UE may transmit in a subframe depends on the number of SC-FDMA symbols available for transmission of control information. SC-FDMA symbols available for transmission of control information means the remaining SC-FDMA symbols except for SC-FDMA symbols used for transmission of RSs in a subframe. In a subframe in which a Sounding Reference Signal (SRS) is configured, the last SC-FDMA symbol of the subframe is also excluded in transmitting the control information. The RSs are used for coherent detection of the PUCCH. The PUCCH supports 7 formats according to transmitted information.

An FDR transmission/reception system capable of simultaneously transmitting and receiving UL and DL signals in the same frequency band divides a frequency or time to maximally double frequency efficiency (spectral efficiency) as compared to a legacy system for transmitting and receiving UL and DL signals and thus has been spotlighted as one of core technologies of a next-generation fifth generation (5G) mobile communication system.

FDR using a single frequency transmission band may be defined as a transmission resource configuration scheme for simultaneously performing transmission and reception through the single frequency transmission band from the viewpoint of an arbitrary wireless device. As a special example thereof, in wireless communication between a general BS (a relay, a relay node, or a Remote Radio Head (RRH)) and a wireless terminal, a transmission resource configuration method of simultaneously performing DL transmission and UL reception of the BS and DL reception and UL transmission of the wireless terminal may be expressed. As another example, a transmission resource configuration scheme for simultaneously performing transmission and reception between the wireless terminals in the same frequency transmission band in device-to-device direct communication (D2D) between wireless terminals may be expressed. Although wireless transmission and reception between the general BS and the wireless terminal and FDR related technologies are described in the present invention, a network wireless device for performing wireless transmission and reception with the UE other than the general BS may be included and direct communication between terminals may be included.

Figure 7:
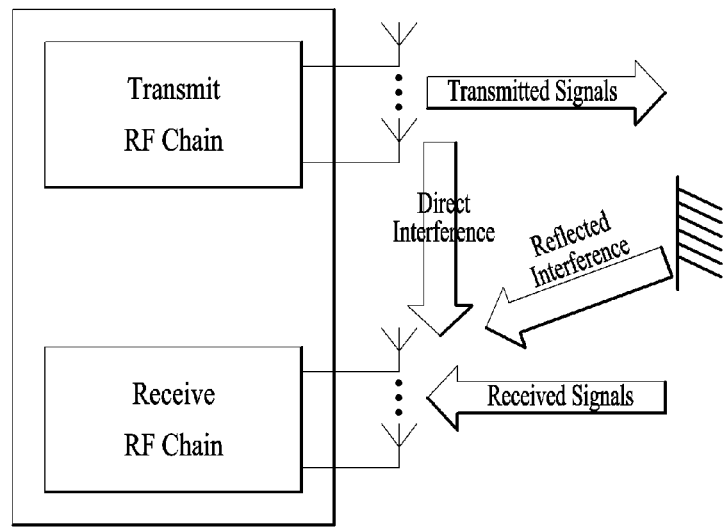
FIG. 7 is a diagram illustrating the concept of a transmission/reception link and self-interference (SI) in an FDR communication situation.

FIG. 7 is a diagram showing the concept of a transmission/reception link and self-interference (SI) in an FDR communication situation.

As shown in FIG. 7, SI may be divided into direct interference caused when a signal transmitted from a transmit antenna directly enters a receive antenna without path attenuation, and reflected interference reflected by peripheral topology, and the level thereof is dramatically greater than a desired signal due to a physical distance difference. Due to the dramatically large interference intensity, efficient self-IC is necessary to operate the FDR system.

To effectively operate the FDR system, self-IC requirements with respect to the maximum transmit power of devices (in the case where FDR is applied to a mobile communication system (BW=20 MHz)) may be determined as illustrated in Table 7 below.

TABLE 7

| Node Type | Max. Tx Power ($P_A$) | Thermal Noise. (BW = 20 MHz) | Receiver NF | Receiver Thermal Noise Level | Self-IC Target ($P_A$-TN-NF) |
|---|---|---|---|---|---|
| Macro eNB | 46 dBm | −101 dBm | 5 dB (for eNB) | −96 dBm | 142 dB |
| Pico eNB | 30 dBm | | | | 126 dB |
| Femto eNB, WLAN AP | 23 dBm | | | | 119 dB |
| UE | 23 dBm | | 9 dB (for UE) | −92 dBm | 115 dB |

Referring to Table 7, it may be noted that to effectively operate the FDR system in a 20-MHz BW, a UE needs 119-dBm Self-IC performance A thermal noise value may be changed to $N_{0,BW}$=−174 dBm+10×$\log_{10}$ (BW). In Table 7, the thermal noise value is calculated on the assumption of a 20-MHz BW. In relation to Table 7, for Receiver Noise Figure (NF), a worst case is considered referring to the 3GPP specification requirements. Receiver Thermal Noise Level is determined to be the sum of a thermal noise value and a receiver NF in a specific BW.

Types of Self-IC Schemes and Methods for Applying the Self-IC Schemes

Figure 8:
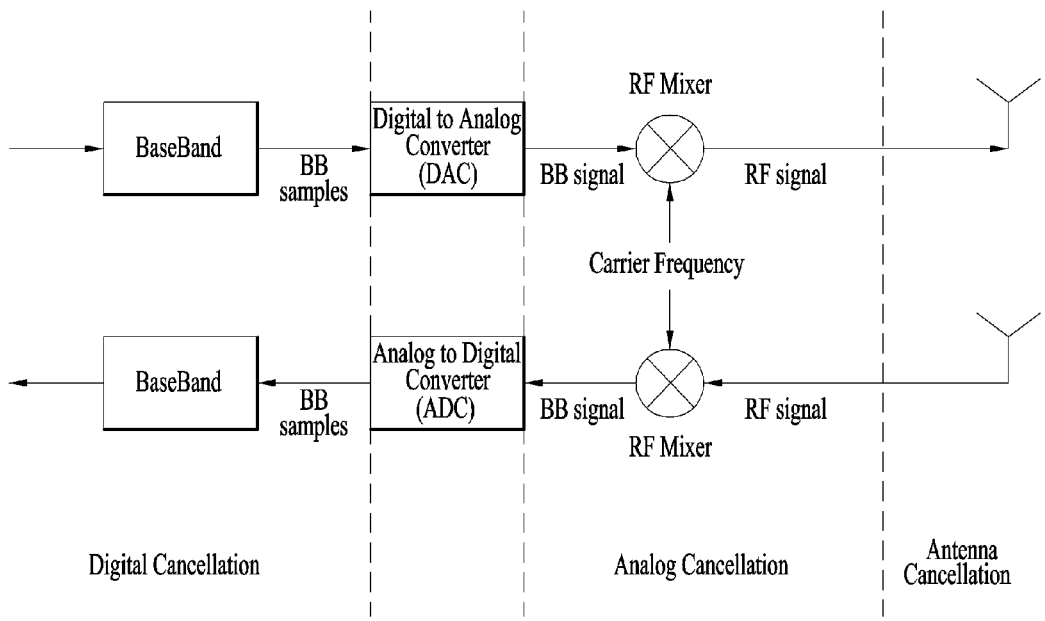
FIG. 8 is a diagram illustrating positions at which three Self-IC schemes are applied, in an RF Tx and Rx end (or an RF front end) of a device.

FIG. 8 is a view illustrating positions at which three Self-IC schemes are applied, in a Radio Frequency (RF) Tx and Rx end (or an RF front end) of a device. Now, a brief description will be given of the three Self-IC schemes.

Antenna Self-IC: Antenna Self-IC is a Self-IC scheme that should be performed first of all Self-IC schemes. SI is cancelled at an antenna end. Most simply, transfer of an SI signal may be blocked physically by placing a signal-blocking object between a Tx antenna and an Rx antenna, the distance between antennas may be controlled artificially, using multiple antennas, or a part of an SI signal may be canceled through phase inversion of a specific Tx signal. Further, a part of an SI signal may be cancelled by means of multiple polarized antennas or directional antennas.

Analog Self-IC: Interference is canceled at an analog end before an Rx signal passes through an Analog-to-Digital Convertor (ADC). An SI signal is canceled using a duplicated analog signal. This operation may be performed in an RF region or an Intermediate Frequency (IF) region. SI signal cancellation may be performed in the following specific method. A duplicate of an actually received SI signal is generated by delaying an analog Tx signal and controlling the amplitude and phase of the delayed Tx signal, and subtracted from a signal received at an Rx antenna. However, due to the analog signal-based processing, the resulting implementation complexity and circuit characteristics may cause additional distortion, thereby changing interference cancellation performance significantly.

Digital Self-IC: Interference is canceled after an Rx signal passes through an ADC. Digital Self-IC covers all IC techniques performed in a baseband region. Most simply, a duplicate of an SI signal is generated using a digital Tx signal and subtracted from an Rx digital signal. Or techniques of performing precoding/postcoding in a baseband using multiple antennas so that a Tx signal of a UE or an eNB may not be received at an Rx antenna may be classified into digital Self-IC. However, since digital Self-IC is viable only when a digital modulated signal is quantized to a level enough to recover information of a desired signal, there is a need for the prerequisite that the difference between the signal powers of a designed signal and an interference signal remaining after interference cancellation in one of the above-described techniques should fall into an ADC range, to perform digital Self-IC.

Figure 9:
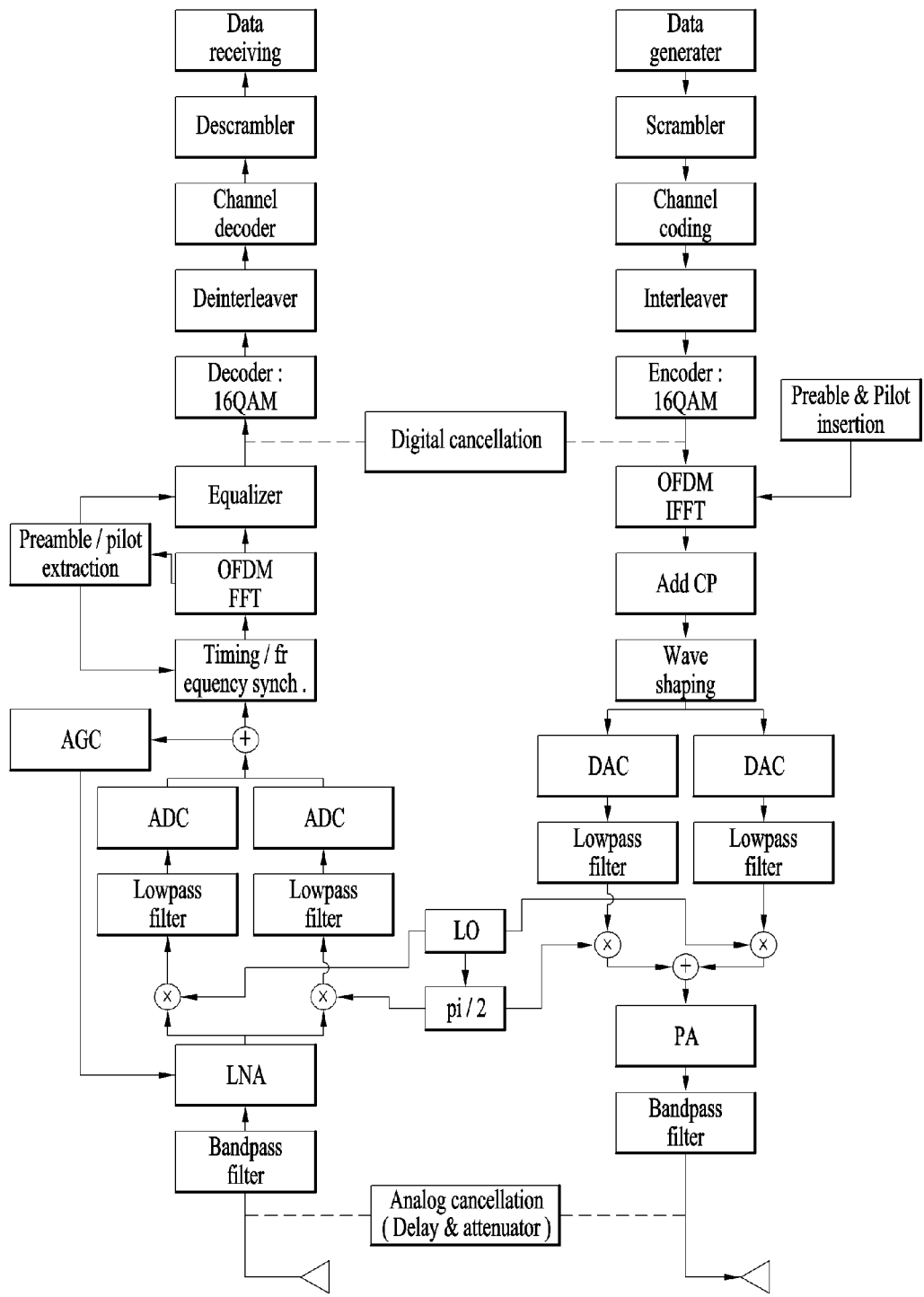
FIG. 9 is a block diagram of a Self-IC device in a proposed communication apparatus in an OFDM communication environment based on FIG. 8.

FIG. 9 is a block diagram of a Self-IC device in a proposed communication apparatus in an OFDM communication environment based on FIG. 8.

While FIG. 9 shows that digital Self-IC is performed using digital SI information before Digital to Analog Conversion (DAC) and after ADC, it may be performed using a digital SI signal after Inverse Fast Fourier Transform (IFFT) and before Fast Fourier Transform (FFT). Further, although FIG. 9 is a conceptual view of Self-IC though separation of a Tx antenna from an Rx antenna, if antenna Self-IC is performed using a single antenna, the antenna may be configured in a different manner from in FIG. 9. A functional block may be added to or removed from an RF Tx end and an RF Rx end shown in FIG. 9 according to a purpose.

The 3GPP LTE system operates based on predetermined fixed UL/DL bands in both TDD and TDD, as illustrated in Table 8. In TDD, a TDD configuration is cell-specifically determined. On the other hand, in FDD, determined UL and DL bands are located in different frequency bands, and one band is determined to be used only for either UE transmission or BS transmission, thus not allowing transmission in the other bands. Table 8 illustrates E-UTRA frequency bands.

TABLE 8

| E-UTRA Operating Band | Uplink (UL) operating band BS receive UE transmit $F_{UL\_low}$-$F_{UL\_high}$ | Downlink (DL) operating band BS transmit UE receive $F_{DL\_low}$-$F_{DL\_high}$ | Duplex Mode |
|---|---|---|---|
| 1 | 1920 MHz-1980 MHz | 2110 MHz-2170 MHz | FDD |

TABLE 8-continued

| E-UTRA Operating Band | Uplink (UL) operating band BS receive UE transmit $F_{UL\_low}$-$F_{UL\_high}$ | Downlink (DL) operating band BS transmit UE receive $F_{DL\_low}$-$F_{DL\_high}$ | Duplex Mode |
|---|---|---|---|
| 2 | 1850 MHz-1910 MHz | 1930 MHz-1990 MHz | FDD |
| 3 | 1710 MHz-1785 MHz | 1805 MHz-1880 MHz | FDD |
| 4 | 1710 MHz-1755 MHz | 2110 MHz-2155 MHz | FDD |
| 5 | 824 MHz-849 MHz | 869 MHz-894 MHz | FDD |
| 6[1] | 830 MHz-840 MHz | 875 MHz-885 MHz | FDD |
| 7 | 2500 MHz-2570 MHz | 2620 MHz-2690 MHz | FDD |
| 8 | 880 MHz-915 MHz | 925 MHz-960 MHz | FDD |
| 9 | 1749.9 MHz-1784.9 MHz | 1844.9 MHz-1879.9 MHz | FDD |
| 10 | 1710 MHz-1770 MHz | 2110 MHz-2170 MHz | FDD |
| 11 | 1427.9 MHz-1447.9 MHz | 1475.9 MHz-1495.9 MHz | FDD |
| 12 | 699 MHz-716 MHz | 729 MHz-746 MHz | FDD |
| 13 | 777 MHz-787 MHz | 746 MHz-756 MHz | FDD |
| 14 | 788 MHz-798 MHz | 758 MHz-768 MHz | FDD |
| 15 | Reserved | Reserved | FDD |
| 16 | Reserved | Reserved | FDD |
| 17 | 704 MHz-716 MHz | 734 MHz-746 MHz | FDD |
| 18 | 815 MHz-830 MHz | 860 MHz-875 MHz | FDD |
| 19 | 830 MHz-845 MHz | 875 MHz-690 MHz | FDD |
| 20 | 832 MHz-862 MHz | 791 MHz-821 MHz | |
| 21 | 1447.9 MHz-1462.9 MHz | 1495.9 MHz-1510.9 MHz | FDD |
| 24 | 1626.5 MHz-1660.5 MHz | 1525 MHz-1559 MHz | FDD |
| ... | | | |
| 33 | 1900 MHz-1920 MHz | 1900 MHz-1920 MHz | TDD |
| 34 | 2010 MHz-2025 MHz | 2010 MHz-2025 MHz | TDD |
| 35 | 1850 MHz-1910 MHz | 1850 MHz-1910 MHz | TDD |
| 36 | 1930 MHz-1990 MHz | 1930 MHz-1990 MHz | TDD |
| 37 | 1910 MHz-1930 MHz | 1910 MHz-1930 MHz | TDD |
| 38 | 2570 MHz-2620 MHz | 2570 MHz-2620 MHz | TDD |
| 39 | 1880 MHz-1920 MHz | 1880 MHz-1920 MHz | TDD |
| 40 | 2300 MHz-2400 MHz | 2300 MHz-2400 MHz | TDD |
| 41 | 2496 MHz-2690 MHz | 2496 MHz-2690 MHz | TDD |
| 42 | 3400 MHz-3600 MHz | 3400 MHz-3600 MHz | TDD |
| 43 | 3600 MHz-3800 MHz | 3600 MHz-3800 MHz | TDD |

Note 1:
Band 6 is not applicable.

However, it was reported that an actual data environment of the UE is characterized by asymmetric data traffic, DL data traffic occupies a larger portion of traffic than UL data traffic in most communication environments, and the traffic amount ratio between UL and DL is about 1:9. Operations in FDD-LTE based on frequency allocation for fixed UL and DL transmission as in Table 8 in this asymmetric data traffic environment may deteriorate resource utilization. To solve this problem, a flexible FDD wireless transmission scheme has been proposed as an initial stage of an FDR system.

The flexible FDD system is used in technology for increasing resource use efficiency according to a traffic environment of the UE by utilizing a UL band as a DL band for a predetermined time, through relaxation of regulations on operations of an FDD system according to actual asymmetric data traffic characteristic. Comparison of resource use efficiency between FDD-LTE and flexible FDD wireless transmission schemes is illustrated in FIG. 10.

Figure 10:
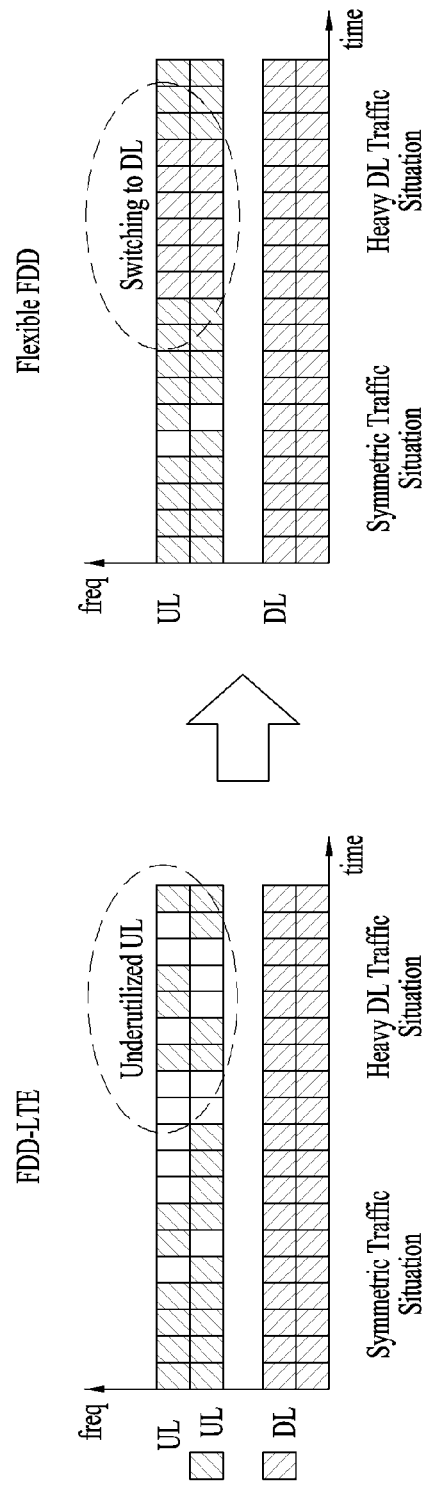
FIG. 10 is a diagram illustrating comparison of resource use efficiency between a legacy FDD-LTE transmission scheme and a flexible FDD wireless transmission scheme (in a symmetric traffic situation and a heavy DL data traffic situation).

FIG. 10 is a diagram illustrating comparison of resource use efficiency between a legacy FDD-LTE transmission scheme and a flexible FDD wireless transmission scheme (in a symmetric traffic situation and a heavy DL data traffic situation).

As illustrated in FIG. 10, since most of DL and UL resources are used in a symmetric data traffic environment, resource efficiency is high. In a heavy DL traffic environment, however, some frequency resources remain unused in a legacy FDD-LTE system and thus are wasted, as apparent from FIG. 10. To solve the problem of the decrease in resource use efficiency, UL frequency resources may be used as DL frequency resources at a specific time, thus increasing resource efficiency in the heavy DL traffic environment. This is illustrated in detail along with a buffer status of traffic to be transmitted in the flexible FDD wireless transmission scheme in FIG. 11.

Figure 11:
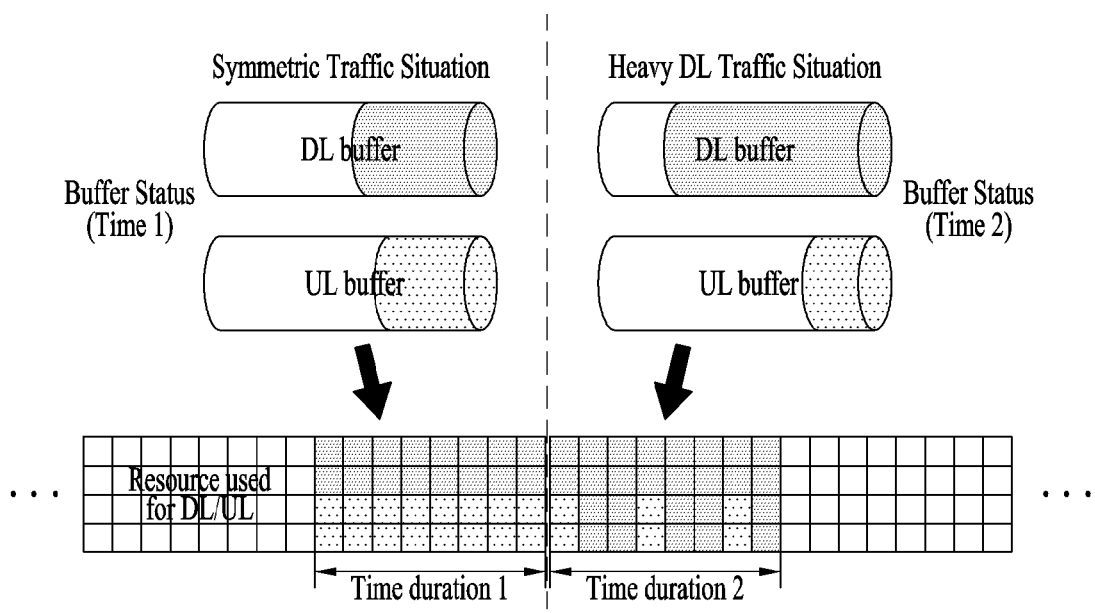
FIG. 11 is a diagram illustrating resource use in a flexible FDD scheme.

FIG. 11 is a diagram illustrating resource use in a flexible FDD scheme.

Since UL frequency resources may be used as DL frequency resources at a specific time, resource efficiency in a heavy DL traffic situation can be raised as compared with resource use in a symmetric traffic situation of FIG. 11.

As illustrated in FIG. 11, the flexible FDD wireless transmission scheme refers to a method of flexibly configuring DL frequency resources and UL frequency resources according to each service or application program. Herein, time resources may be configured in units of a time slot, subframe, or frame including one or more transmission symbols. The flexible FDD wireless transmission scheme offers the benefits of support for wireless transmission resource allocation optimized for the service and application characteristics of each individual wireless terminal and increased total frequency use efficiency in the coverage of a BS.

Figure 12:
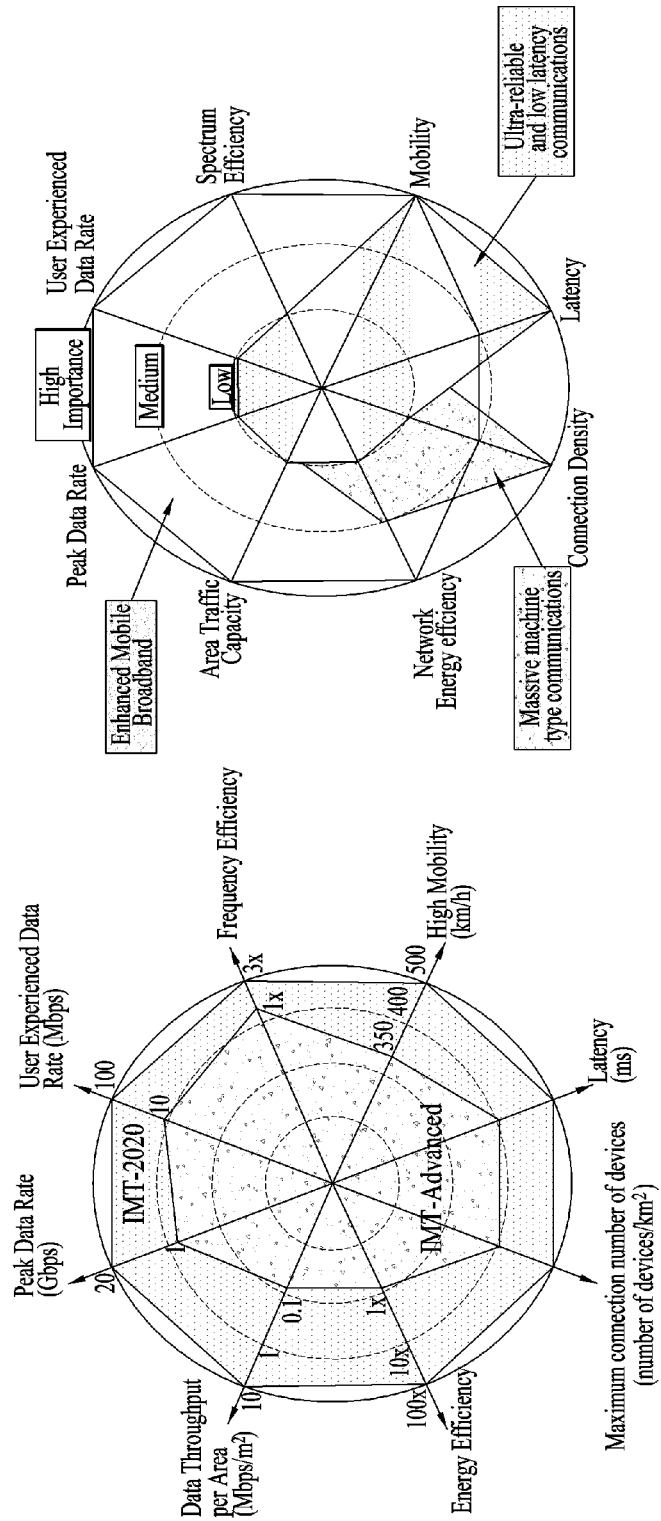
FIG. 12 is a diagram illustrating core performance requirements for 5G proposed in IMT 2020 and per-service scenario association with the 5G performance requirements on a per-service scenario basis.

FIG. 12 is a diagram for explaining IMT 2020 core performance requirements for 5G and association with the 5G performance requirements on a per-service scenario basis.

FIG. 12 illustrates core performance requirements for 5G proposed in IMT 2020 and per-service scenario association with the 5G performance requirements on a per-service scenario basis.

Particularly, uMTC Service has a very limited Over-The-Air (OTA) latency requirement and requires high mobility and high reliability (OTA latency: <1 ms, Mobility: >500 km/h, BLER: <$10^{-6}$).

Figure 13:
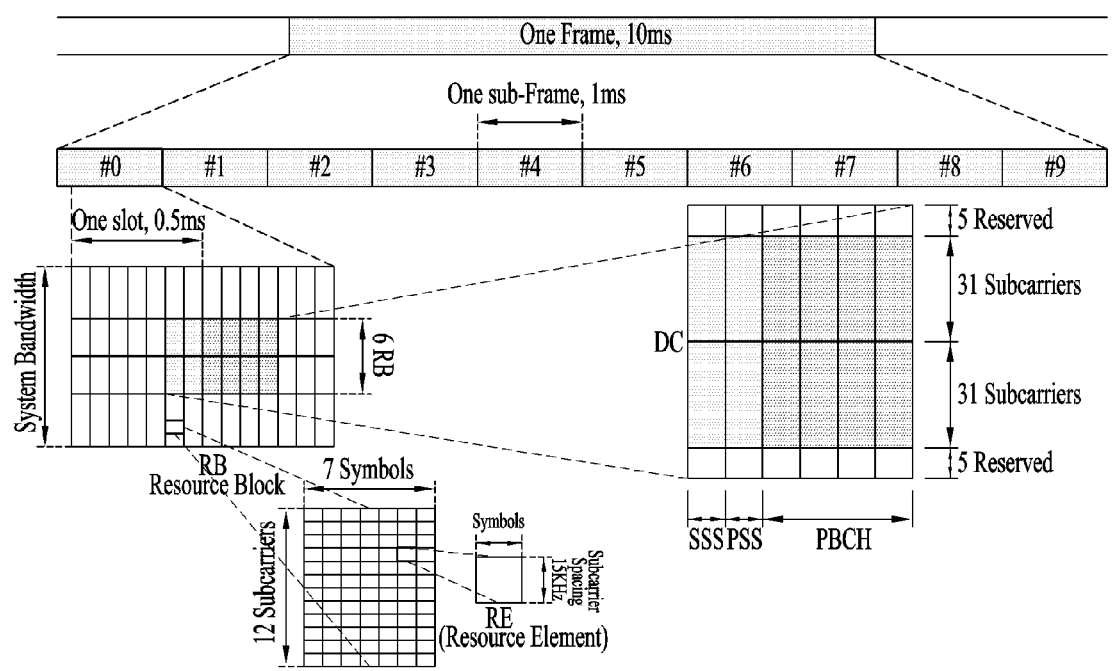
FIG. 13 is a diagram illustrating an LTE/LTE-A frame structure.

FIG. 13 is a diagram illustrating an LTE/LTE-A frame structure.

FIG. 13 illustrates the basic concept of an LTE/LTE-A frame structure. One frame includes 10 1-ms subframes each having a length of 10 ms. One subframe includes two 0.5-ms slots each having 7 OFDM (Orthogonal Frequency Division Multiplexing) symbols. One resource block (RB) is defined by 12 subcarriers with a subcarrier spacing of 15 kHz and 7 OFDM symbols. A BS transmits a Primary Synchronization Signal (PSS) and a Secondary Synchronization Signal (SSS) for synchronization, and a Physical Broadcast Channel (PBCH) for system information, in 6 RBs corresponding to a center frequency. The frame structure and the positions of signals and channels may vary depending on a normal/extended cyclic prefix (CP) and TDD/FDD.

Figure 14:
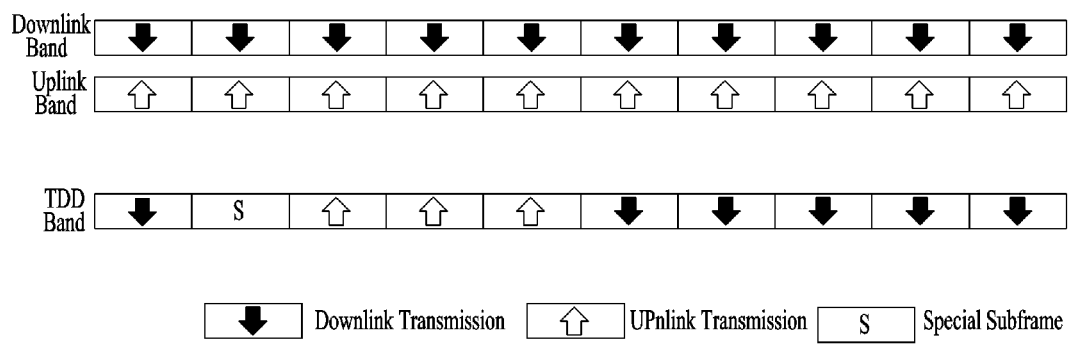
FIG. 14 is a diagram illustrating exemplary FDD and TDD frame structures in an LTE/LTE-A system.

FIG. 14 is a diagram illustrating exemplary FDD and TDD frame structures in an LTE/LTE-A system.

Referring to FIG. 14, in the FDD frame structure, a DL frequency band and UL frequency band are separate and, in the TDD frame structure, a DL region and a UL region are distinguished on a subframe basis within the same band.

Figure 15:
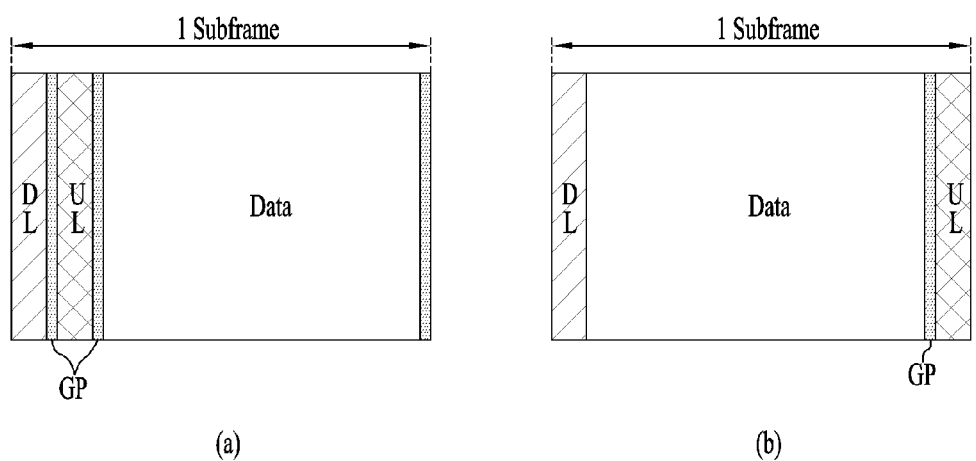
FIG. 15 is a diagram illustrating an exemplary self-contained subframe structure.

FIG. 15 is a diagram illustrating an exemplary self-contained subframe structure.

FIG. 15 illustrates self-contained subframe structures proposed to satisfy a low latency requirement among 5G performance requirements. According to a TDD-based self-contained subframe structure, a DL resource duration and a UL resource duration (e.g., a DL control channel and a UL control channel), a Guard Period (GP) for solving the problem of interference between DL and UL, and a resource duration for data transmission are present in one subframe.

(a) of FIG. 15 illustrates an exemplary frame structure in which a subframe is configured in the order of DL, UL, and data resource durations and a GP is interposed between resource durations. In (a) of FIG. 15, a DL resource duration represented as DL may be a resource duration for a DL control channel and a UL resource duration represented as UL may be a resource duration for a UL control channel.

(b) of FIG. 15 illustrates another exemplary fame structure in which a subframe is configured in the order of DL, data, and UL resource durations and a GP exists only before the UL resource duration. Similarly, in (b) of FIG. 15, a DL resource duration represented as DL may be a resource duration for a DL control channel and a UL resource duration represented as UL may be a resource duration for a UL control channel.

Figure 16:
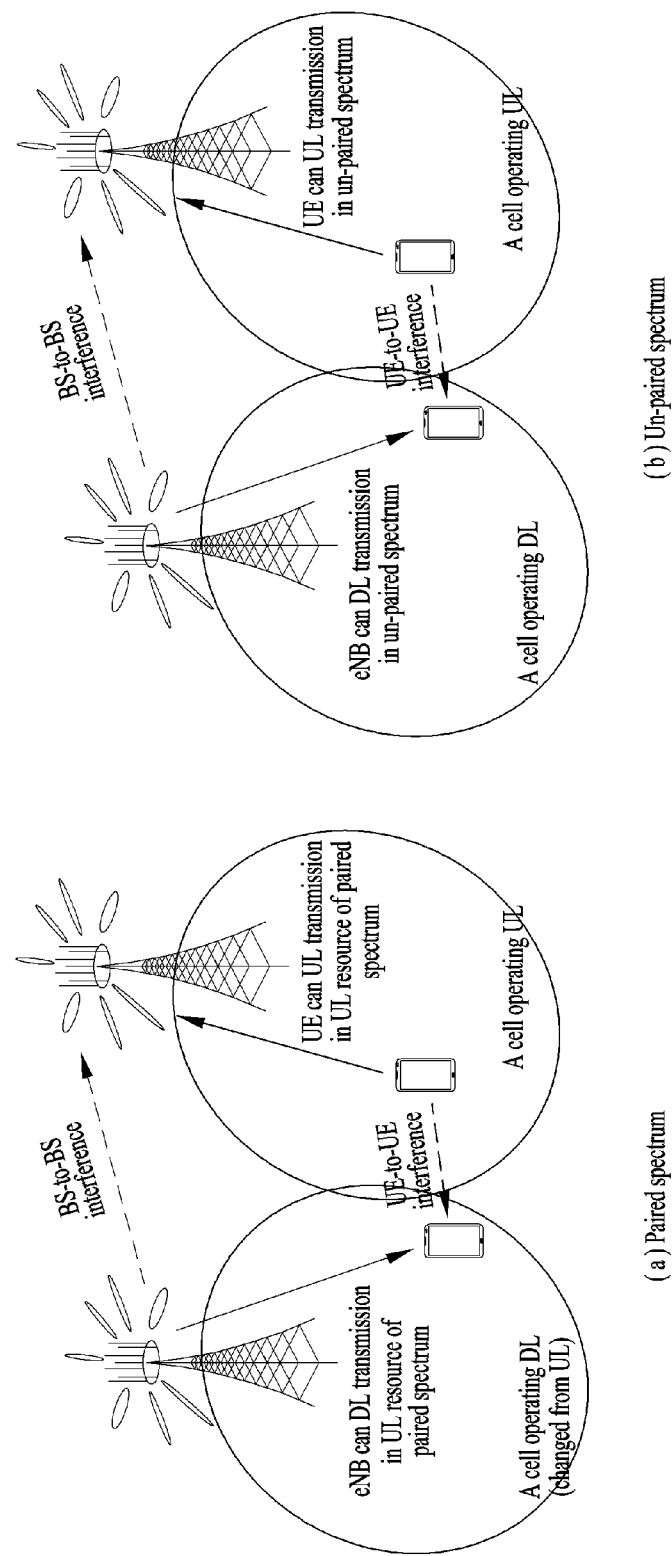
FIG. 16 is a diagram illustrating exemplary cross-link interference for a TDM flexible duplex operation in a paired or unpaired spectrum.

FIG. 16 is a diagram illustrating exemplary cross-link interference for a TDM flexible duplex operation in a paired or unpaired spectrum.

Interference which should be additionally considered in operating flexible duplex will hereinafter be referred to as cross-link interference. More specifically, as an adjacent BS performs a DL/UL operation in a different direction, a DL signal of the adjacent BS acts as interference to a specific BS during UL reception of the specific BS. Further, a UL signal of the adjacent BS interferes with DL reception of a specific UE. Such cross-interference is illustrated in detail according to a paired spectrum and an unpaired spectrum in FIG. 16.

Figure 17:
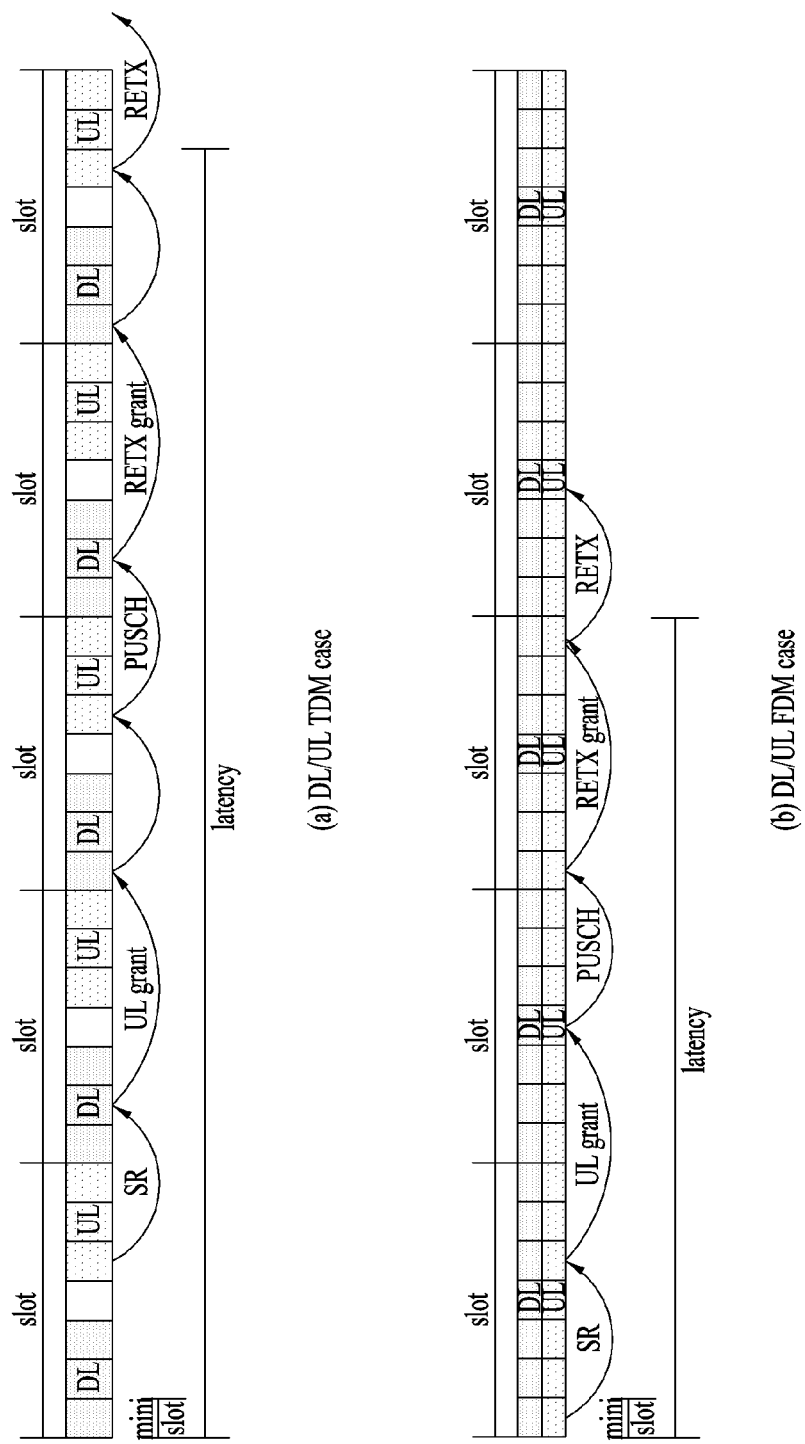
FIG. 17 is a diagram illustrating exemplary latency in DL/UL Time Division Multiplexing (TDM) and Frequency Division Multiplexing (FDM) cases.

Limitation of Duplexing Flexibility with TDM Manner and Duplexing Flexibility with FDM Manner FIG. 17 is a diagram illustrating exemplary latency in DL/UL Time Division Multiplexing (TDM) and Frequency Division Multiplexing (FDM) cases.

Duplexing flexibility with TDM manner may cause additional delay due to time allocation between DL and UL transmission in terms of a TDM characteristic. In addition, a 5G system may be designed to simultaneously support a plurality of services such as enhanced Mobile Broadband (eMBB) and Ultra-Reliable and Low-Latency Communication (URLLC). In the case of TDM, when URLLC is supported in the TDM manner, latency may occur in a DL heavy or UL heavy environment. FIG. 17 illustrates exemplary latency generated in a TDM case and an FDM case.

Duplexing flexibility with TDM manner may have limitations in terms of latency and management of a plurality of services. To solve the problem, a scheme of using a part of DL or UL resources as UL or DL resources at a specific time as illustrated in FIG. 18 may be referred to as duplexing flexibility with FDM manner.

Figure 18:
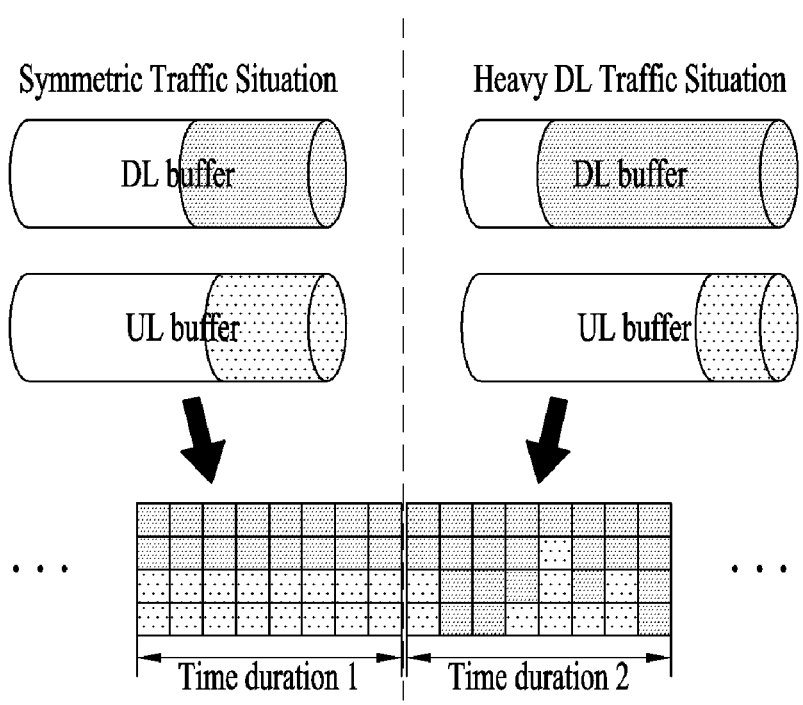
FIG. 18 is a diagram illustrating exemplary resource utilization in duplexing flexibility with FDM manner (a heavy DL case).

FIG. 18 is a diagram illustrating exemplary resource utilization in duplexing flexibility with FDM manner (a heavy DL case).

In operating as duplexing flexibility with FDM manner as illustrated in FIG. 18, another type of interference different from cross-link interference occurs. This type of interference corresponds to interference generated by in-band emission from a DL signal as illustrated in FIG. 19.

Figure 19:
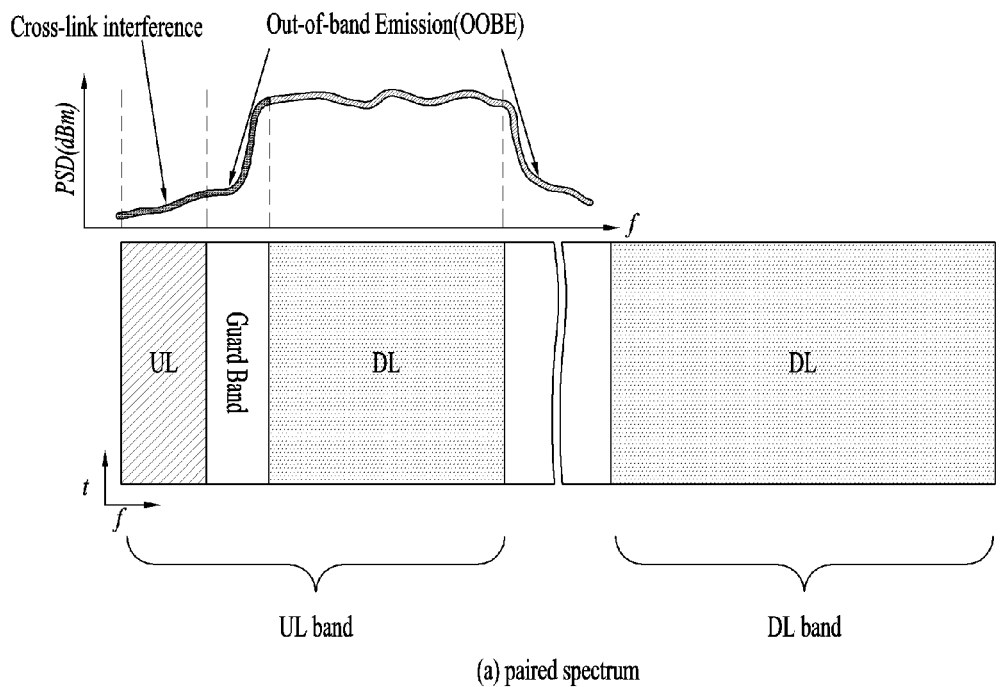
FIG. 19 is a diagram illustrating examples of interference of duplexing flexibility with FDM manner in paired and unpaired spectrums or a per-subband DL/UL configuration.
Figure 19:
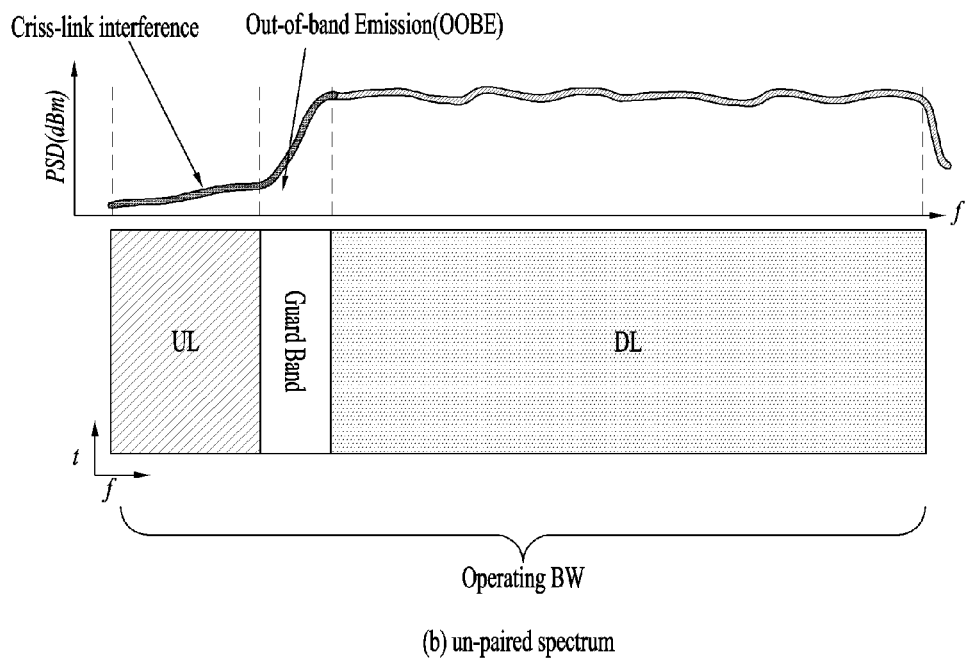

FIG. 19 illustrates examples of interference of duplexing flexibility with FDM manner in paired and unpaired spectrums or a per-subband DL/UL configuration.

Referring to FIG. 19, in-band emission occurs from a DL transmission signal to an adjacent UL reception band and in-band emission acts as interference during UL reception.

It is apparent that, in FDM-manner operation, performance of a communication device is degraded during UL signal reception due to in-band emission in an adjacent band, caused during DL signal transmission in the adjacent band (for example, the adjacent band corresponds to "DL" duration within the UL band in FIG. 19). The "DL" duration within the UL band in FIG. 19 may be defined as flexible downlink duration because the "DL" duration within the UL band in FIG. 19 may be flexibly changed to "UL" duration according to DL/UL configuration change, etc. The most passive method for preventing performance degradation is to physically separate a transmission antenna from a reception antenna or set a guard band of a sufficient size between a reception band and a transmission band. However, this method cannot eliminate the effect of performance degradation brought about by emission. Accordingly, it is necessary to limit emission elimination methods, along with the foregoing method. The present invention is intended to provide a design of a Reference Signal (RS) for measurement of an interference channel, required to cancel in-band emission, a procedure for managing the RS, and related signaling. Before a description of the present invention, the characteristics of interference from in-band emission need to be determined as follows.

(1) IQ Image Interference of Transmission Signal

Figure 20:
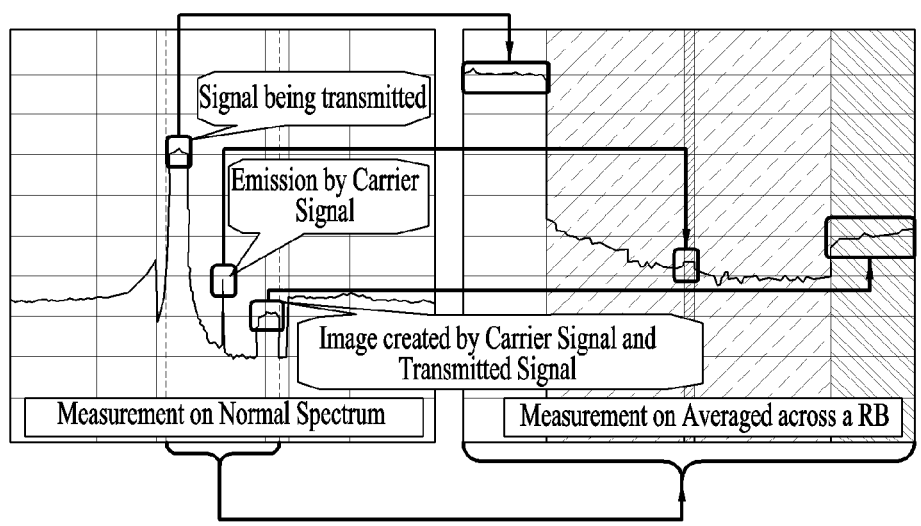
FIG. 20 is a diagram illustrating carrier leakage and image interference generated by impairment of an RF chain of a partial RB.

FIG. 20 is a diagram illustrating carrier leakage and image interference generated by impairment of an RF chain of a partial RB. In FIG. 20, the horizontal axis indicates frequency and the vertical axis indicates power strength.

A transmission signal is changed due to impairment of a transmission/reception RF chain. Among the changes, modular image interference is generated by imbalance between amplitude and phase. As illustrated in FIG. 20, interference is produced in the form of a mirror image in an opposite RB to a transmission RB by impairment of the RF chain during transmission of a partial RB.

(2) Modeling of IQ Image Interference

A signal in an l-th OFDM symbol in a transmitter is expressed as Equation 1.

$$x_\ell[n] = \sum_{k=-N/2}^{N/2-1} S_{k,\ell} \exp\left[j2\pi k \Delta f \frac{n}{N}\right] \quad \text{[Equation 1]}$$

In this case, N is the total number of subcarriers and $S_{k,l}$ is a constellation symbol transmitted in a k-th subcarrier of the l-th OFDM symbol.

If the OFDM signal is modulated to a center frequency $f_c$, the resulting signal is given as Equation 2.

$$r(t)=Re\{x(t)e^{j2\pi f_c t}\}=x(t)e^{j2\pi f_c t}+x^*(t)e^{-j2\pi f_c t} \quad \text{[Equation 2]}$$

Herein, a signal recovered by a non-ideal In-phase/Quadrature (I/Q) modulator may be summarized as Equation 3.

$$y_{IQ}(t) = LP\{r(t)(\cos(2\pi f_c t) - j\beta\sin(2\pi f_c t + \phi))\} \quad \text{[Equation 3]}$$

$$\stackrel{(1)}{=} LP\{(x(t)e^{j2\pi f_c t} + x^*(t)e^{-j2\pi f_c t})(\gamma_1 e^{-j2\pi f_c t} + \gamma_2 e^{j2\pi f_c t})\}$$

$$\stackrel{(2)}{=} x(t)\gamma_1 + x^*(t)\gamma_2$$

Herein, LP represents low-pass filtering. The procedure of $\stackrel{(1)}{=}$ is summarized using $\gamma_1=(1+\beta e^{-j\phi})/2$ and $\gamma_2=(1-\beta e^{-j\phi})/2$ obtained by modeling an amplitude error β and a phase error φ and the procedure of $\stackrel{(2)}{=}$ is a representation of results obtained by low-pass filtering. Substitution of Equation 1 into Equation 3 leads to Equation 4.

$$y_{IQ}(t) =  \quad \text{[Equation 4]}$$

$$\sum_{k=-N/2}^{N/2-1}\left(\frac{1+\beta e^{-j\phi}}{2}S_{k,\ell} + \frac{1-\beta e^{-j\phi}}{2}S^*_{-k,\ell}\right)\exp\left[j2\pi k \Delta f \frac{t}{N}\right]$$

To summarize the equation using β=1+q and Q(β,φ)=(q−jφ−qjφ)/2, Equation 5 is obtained.

$$y_{IQ}(t) = \sum_{k=-N/2}^{N/2-1} S_{k,\ell}\exp\left[j2p k \Delta f \frac{t}{N}\right] + \quad \text{[Equation 5]}$$

$$Q(\beta, \phi)\sum_{k=-N/2}^{N/2-1}(S_{k,\ell}-S^*_{-k,\ell})\exp\left[j2\pi k \Delta f \frac{t}{N}\right]$$

It is noted from the second term of Equation 5 that two errors are generated due to I/Q imbalance. One of the errors is an error $S_{k,l}$ occurring in the same subcarrier and the other error is an error $S_{-k,l}^*$ occurring in a mirror-image subcarrier. That is, IQ image interference may be composed of an I/Q imbalance error component Q(β,φ) and a conjugate $S_{-k,l}^*$ of a transmission signal.

Hereinbelow, the present invention proposes techniques for effectively applying a duplexing flexibility wireless transmission scheme for wireless transmission between a BS and a wireless terminal. A communication device expressed throughout the present patent may be a UE or a BS. The BS may be referred to as a relay, a relay node, a Remote Radio Head (RRH), a Transmission and Reception Point (TRP), etc. The present invention is intended to design an RS for measurement of a channel of emission interference from an adjacent band generated in duplexing flexibility with FDM manner wireless transmission scheme and to propose exemplary signaling to support the RS. In the present invention, the proposals are described and detailed embodiments in each proposal are described. The proposals and the detailed embodiments in each proposal may be coupled or combined.

When a specific TRP changes a DL/UL configuration in a specific sub-band for duplexing flexibility with FDM manner, in-band emission interference (or in-band emission interference signal) occurs and cross-link interference is generated between BSs or UEs that differ in transmission directions. As a result, the UL reception performance of the TRP may be degraded. Thus, there is a need for a receiver capable of suppressing or canceling in-band emission interference and cross-link interference. However, to operate the receiver, it is essential to estimate the gain of a channel experienced by in-band interference or cross-link interference. The present patent will focus on in-band emission rather than cross-link interference. Therefore, the following proposals are described to estimate a channel of in-band emission interference.

Proposal 1

A mirror-image signal may be used for the purpose of estimating channel gain or an interference signal caused by in-band emission received in an adjacent band or acquiring interference information of the interference signal.

In order to suppress or cancel interference caused by in-band emission, the channel gain of an interference signal generated by in-band emission needs to be estimated. If a DL signal is transmitted in a sub-band, a mirror-image is generated in the opposite band based on a DC subcarrier. In this proposal, the channel gain of an interference signal caused by in-band emission may be estimated using a known signal included in a mirror-image signal. A mirror-image component of Equation 5 is expressed as Equation 6.

$$y_{Mirror}(t) = Q(\beta, \phi)\sum_{k=-N/2}^{N/2-1} S^*_{-k,l} \times \exp\left[j2\pi k \Delta f \frac{t}{N}\right] \quad \text{[Equation 6]}$$

In this case, it may be assumed that Q(β,φ)=(q−jφ−qjφ)/2 is not instantaneously changed and may be estimated over a long term, due to hardware impairment.

Proposal 1-1

A TRP may use a DL mirror image signal by processing a UL reception signal as noise for the purpose of estimating channel gain of an interference signal or obtaining interference information, caused by in-band emission received in an adjacent band.

To suppress or cancel interference caused by in-band emission, it is necessary to estimate an in-band emission channel From the viewpoint of reception of the TRP, in-band emission interference may occur from a DL signal of an adjacent band during reception of a UL signal. If the power of the received UL signal is remarkably lower than the power of an in-band emission signal by a predetermined threshold value, the received UL signal may be processed as noise and channel gain of an interference signal caused by in-band emission may be estimated or interference information (e.g., signal-to-interference-plus-noise ratio (SNIR) information) of the interference signal may be acquired based on DL mirror image signals. Herein, all of an RS or data signal among the mirror image signals may be used. For channel estimation, a modified signal as indicated in Equation 6 may be used.

Proposal 1-2

An orthogonal RS may be used for the purpose of estimating channel gain of an interference signal caused by in-band emission received in an adjacent band or acquiring interference information of the interference signal. More specifically, a DL mirror image and a UL RS may be distinguished by different frequency resources, time resources, or code resources.

To suppress or cancel interference caused by in-band emission, it is necessary to estimate an in-band emission channel From the viewpoint of reception of the TRP, in-band emission interference may occur from a DL signal of an adjacent band during reception of a UL signal. Therefore, the usage range of RSs may vary depending on a UL frame structure and a DL frame structure.

A plurality of RSs already exist for cellular communication, as follows.

(1) DM-RS for DL
(2) CSI-RS for DL
(3) PT-RS (Phase-tracking RS) for DL
(4) DM-RS for UL
(5) PT-RS for UL
(6) SRS (Sounding Reference Symbol) for UL At present, NR of a 5G communication system uses DM-RS for channel estimation. Thus, embodiments of the present patent have been described based on DM-RS. However, it is obvious that channel estimation of in-band emission may be performed using CSI-RS, SRS, PT-RS for UL and PT-RS for DL as well as DM-RS. In addition, if an RS other than the above RSs is designed for a specific purpose in 5G NR, the RS may be used for channel estimation of in-band emission.

The present patent is based on the assumption that channel estimation of in-band emission is performed using the above-described RSs. However, since a data signal other than an RS is also a known signal like the RS on the part of a transmitter, the data signal may also be used for channel estimation of in-band emission.

Figure 21:
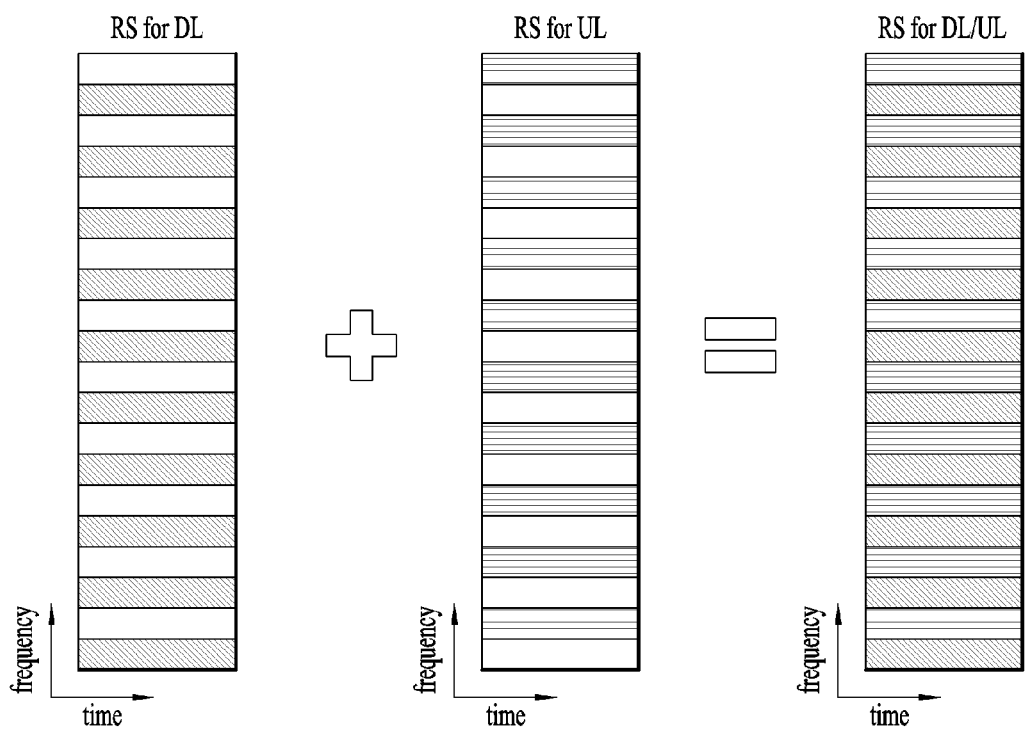
FIG. 21 is a diagram illustrating an example of allocating RSs for DL/UL to different frequencies to measure cross-link interference according to Embodiment 1-1.

FIG. 21 is a diagram illustrating an example of allocating RSs for DL/UL to different frequencies to measure cross-link interference according to Embodiment 1-1.

Embodiment 1-1 relates to an embodiment of achieving an orthogonal property between an RS for DL and an RS for UL by different frequencies as in FDM. as an RS in a DL mirror image and an RS for UL use different frequencies or physical resources, orthogonality may be maintained and distinguishment may be made between the RS of the DL mirror image and the RS for UL. Embodiment 1-1 is an example in which the RS of the DL mirror image is configured non-continuously, and the RS for UL is configured non-continuously in frequencies or physical resources unused for the RS of the DL mirror image. However, the present invention is not limited to the combination of Embodiment 1-1 and thus it is obvious that any other combination using different frequencies or physical resources is applicable.

Figure 22:
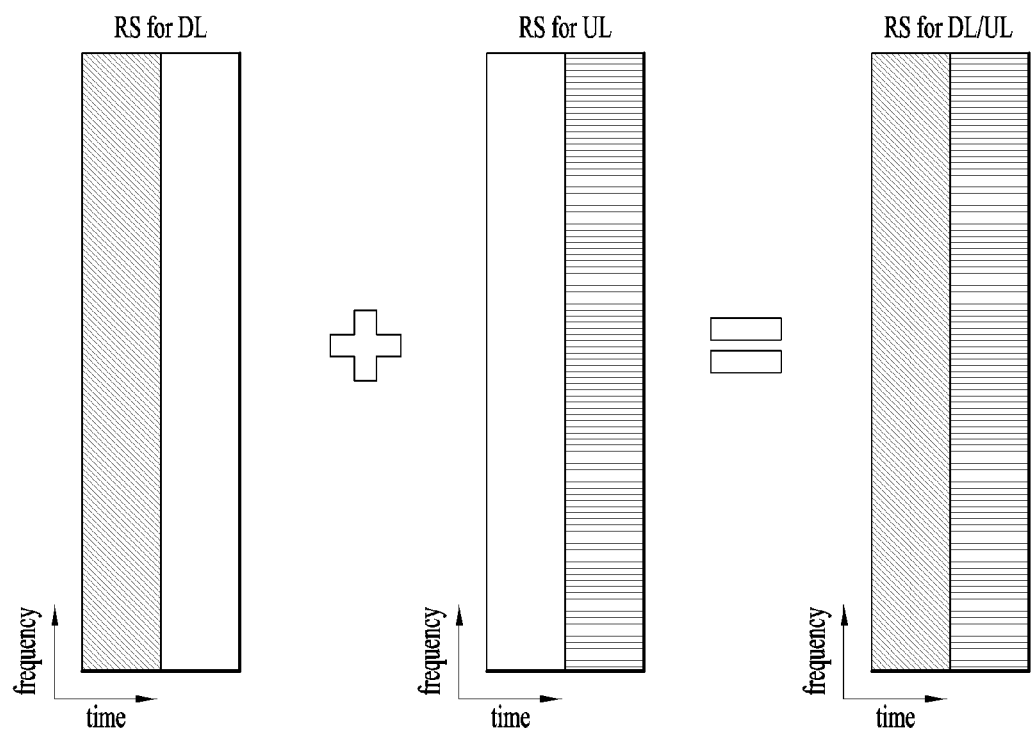
FIG. 22 is a diagram illustrating an example of doubling a basic subcarrier spacing and allocating RSs for DL/UL to different times to measure cross-link interference according to Embodiment 1-2.

FIG. 22 is a diagram illustrating an example of doubling a basic subcarrier spacing and allocating RSs for DL/UL to different times to measure cross-link interference according to Embodiment 1-2.

Embodiment 1-2 is an embodiment of achieving orthogonality between an RS in a DL mirror image and an RS for UL by different time resources. According to Embodiment 1-2, as the RS in the DL mirror image and the RS for UL use different time resources or symbols, orthogonality may be maintained and distinguishment may be made between the RS in the DL mirror image and the RS for UL. Embodiment 1-2 enables transmission in different time resources by reducing a symbol duration using different subcarriers from those of legacy data transmission (e.g., using 30 kHz, not 15 kHz). Embodiment 1-2 is an example in which the RS in the DL mirror image is configured in a specific time resource or symbol and the RS for UL is configured in time resources or a symbol unused for the RS in the DL mirror image. However, the present invention is not limited to Embodiment 1-2 and any other combination using different times or symbols based on time resources generated by use of a symbol duration reduced through use of subcarriers of a different size is applicable.

Figure 23:
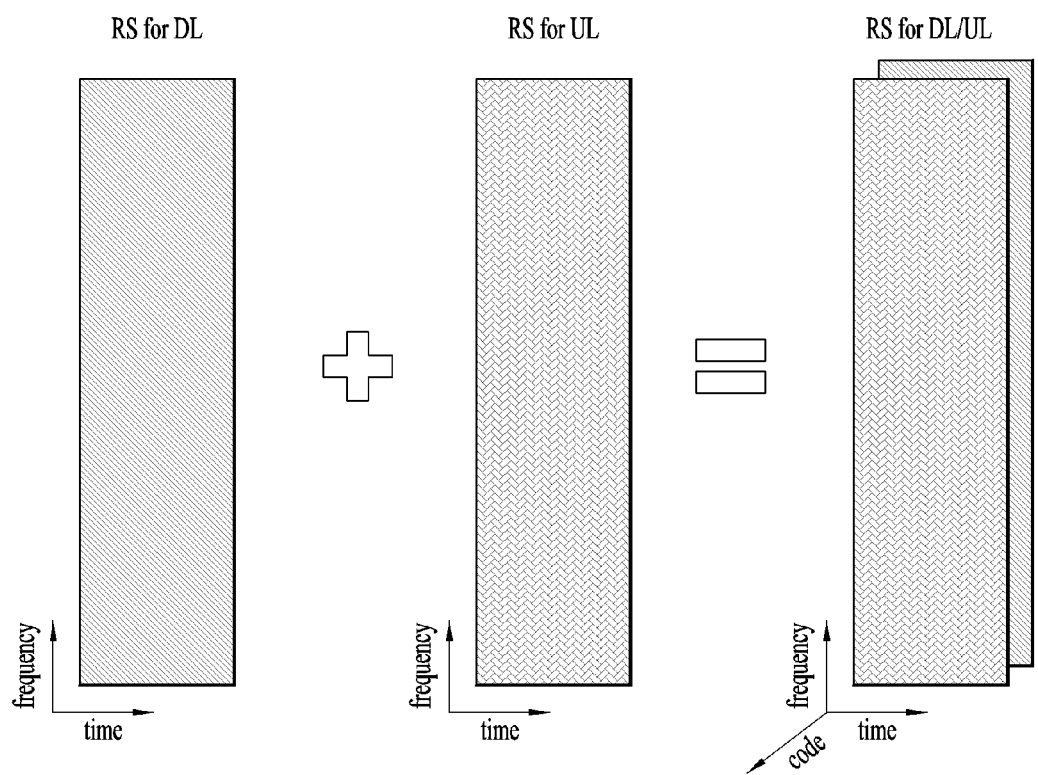
FIG. 23 is a diagram illustrating an example of allocating RSs for DL/UL to different codes to measure cross-link interference according to Embodiment 1-3.

FIG. 23 is a diagram illustrating an example of allocating RSs for DL/UL to different codes to measure cross-link interference according to Embodiment 1-3.

Embodiment 1-3 is an embodiment of achieving orthogonality between an RS in a DL mirror image and an RS for UL by code resources. As in Embodiment 1-3, as the RS in the DL mirror image and the RS for UL use different orthogonal codes, orthogonality may be maintained and distinguishment may be made between the RS in the DL mirror image and the RS for UE. Embodiment 1-3 is an example in which a specific code is configured for the RS in the DL mirror image and a different code orthogonal to a code used for the RS in the DL mirror image is configured for the RS for UL. However, the present invention is not limited to the combination of Embodiment 1-3 and thus any other combination using different orthogonal codes is applicable.

In addition, any combination of the proposed Embodiment 1-1, Embodiment 1-2, and Embodiment 1-3 is possible. For example, specific TRP groups may use different frequencies and different codes may be used between TRPs within each group by combination of Embodiment 1-1 and Embodiment 1-3.

Interference from a mirror image is a modification of a signal transmitted by the same node and thus includes a known signal. Since a hardware impairment value $(Q(\beta,\phi)=(q-j\phi-qj\phi)/2)$ may be estimated over a long term, it may be assumed that the value is known. A data signal as well as an RS is a known signal and thus may be used in channel estimation of in-band emission. Proposal 1-2 may be performed along with or independently of Proposal 1-1.

Proposal 1-3

To utilize a mirror image signal for the purpose of estimating channel gain of an interference signal caused by in-band emission received in an adjacent band or acquiring interference information of the interference signal, a TRP may puncture specific resources (a UL data part, a UL RS part, etc.) in the same frequency or same time as that of a DL RS. To support this, the TRP may signal puncturing information to a UE.

If the TRP performs puncturing by informing the UE of a mirror image frequency, the TRP (or BS) may perform channel estimation and interference cancellation.

In Embodiment 1-4, the TRP may estimate a channel of in-band emission interference received in an adjacent band or predict the amount of interference by puncturing resources corresponding to a UL data region located in the same frequency and the same time as those of a DL RS. In addition, because only minimum resources as requested may be configured to be punctured as in the following embodiment, the TRP may acquire information about in-band emission interference in consideration of resource efficiency.

If such puncturing is configured for UL transmission resources of the UE, this may amount to rate matching during UL signal transmission. The UL signal transmission resources may correspond to reserved resources for the UE. Alternatively, in the case of a self-contained frame structure, in-band emission may be measured using a GP generated when DL is switched to UL. Further, the GP generated when DL is switched to UL may change the starting time of UL transmission, dynamically or statically. When the starting time of UL transmission is statically changed, the starting time or the length of the GP may be different in a specific slot (or subframe) set or slots (or subframes). Alternatively, these resources may exist between a PUSCH region and a UCI region. Although it is preferred to distribute such puncturing with uniform density across a total band to be estimated, transmission may be performed in some sub-bands in the case of specific measurement.

Embodiment 1-5 is an embodiment in which the TRP estimates a channel of in-band emission interference from an adjacent band or predicts the amount of interference by puncturing resources corresponding to an RS of UE located in the same frequency and same time as those of an RS of DL. If a common design is applied to the DL RS and the UL RS, they may exist in the same frequency and same time. If the two RSs overlap in all frequencies, the DL RS and the UL RS may be utilized orthogonally by Proposal 1-2. However, if the DL RS and the UL RS partially overlap, the overlapping part may be punctured by Proposal 1-3.

If the UL RS is punctured in Embodiment 1-5, a problem may arise in decoding UL data. In Embodiment 1-6, to solve this problem, the BS (or TRP) may use channel information estimated from a previous symbol. As another solution, the BS requests that the UE transmit signaling for RS transmission at a different position.

Proposal 2

The TRP may signal information for blanking (puncturing) UE-specific resources to the UE in order to estimate channel gain of an interference signal caused by in-band emission received in an adjacent band or acquire interference information of the interference signal.

To support Proposal 1-3, the TRP may signal the blanking (puncturing) resource information to the UE that will perform UL transmission in order to estimate channel gain of an interference signal caused by in-band emission received in an adjacent band. More specifically, if specific UL resources are punctured, a mirror image included in in-band emission may be utilized. For this purpose, the TRP may inform the UE of information about the positions of resources to be punctured through a PDCCH or a PDSCH.

Proposal 3

For the purpose of estimating channel gain of an interference signal caused by in-band emission received in an adjacent band or acquiring interference information of the interference signal, rate matching may be performed to blank (puncture) TRP-specific or UE-specific resources.

Proposal 1-3 includes blanking (or puncturing) specific resources (resources for data transmission in the above embodiment (PDSCH or PUSCH in LTE-(A))). For this purpose, a TRP for transmitting a specific DL signal or a UE for transmitting a specific UL signal may perform rate matching to puncture resources which may be required to estimate channel gain of an interference signal caused by in-band emission received in an adjacent band or acquire interference information.

Proposal 4

To secure orthogonality between a DL RS and a UL RS for the purpose of estimating the channel gain of an interference signal caused by in-band emission received in an adjacent band or acquiring interference information of the interference signal, or to exchange information about RS positions for the purpose of acquiring information about interference caused by in-band emission, backhaul signaling or over-the-air (OTA) signaling may be used.

For the purpose of estimating channel gain of an interference signal caused by in-band emission received in an adjacent band or acquiring interference information of the interference signal, the TRP may use backhaul signaling or OTA signaling to secure orthogonality between a DL RS and a UL RS by Proposal 1-2 or to blank (or puncture) specific resources by Proposal 1-3. In addition, in the case of blanking (or puncturing) in Proposal 1-3, if the positions of blanked (or punctured) resources are connected to a guard time, they may be indicated implicitly by information about the changed guard time.

The above specified backhaul signaling or OTA signaling may include information about a DL RS (TDM/FDM/CDM), information about a UL RS (TDM/FDM/CDM), information about orthogonality between the DL RS and the UL RS, and information about a transmission direction of a sub-band.

The information about the DL RS signal (TDM/FDM/CDM) may include (1) information about a frequency location and a symbol location of the RS, (2) cell ID scrambling information for distinguishing between BSs, (3) numerology information or symbol information in the case of TDM, (4) pattern information in the case of FDM, (5) code information (code type, code index (root index, etc.), code length, etc.) in the case of CDM, and (6) information about a frequency location and a symbol location of puncturing.

The information about the UL RS (TDM/FDM/CDM) may include (1) information about a frequency location and a symbol location of the RS, (2) cell ID scrambling information for distinguishing between BSs, (3) numerology information or symbol information in the case of TDM, (4) pattern information in the case of FDM, (5) code information (code type, code index (root index, etc.), code length, etc.) in the case of CDM, and (6) information about a frequency location and a symbol location of puncturing.

The information about a transmission direction of a sub-band may include information about an intended transmission direction of a sub-band and information about a transmission direction of an adjacent TRP.

Proposal 5

To maintain orthogonality between a UL RS and a DL RS, a guard time of a specific length may be disposed before and/or after the UL RS and/or the DL RS.

In Proposal 1 described above, time synchronization between a DL RS and a UL RS may not be perfectly matched due to DL-UL asynchronization caused by timing advance of a UE and/or a synchronization problem of a BS, and/or a change in propagation delay ($D_{TRP \to UE}$) between the UE and the BS. Especially, time synchronization between DL reception and UL transmission of the UE may be misaligned by $2 \times D_{TRP \to UE}$. To maintain orthogonality between the DL RS and the UL RS in this situation, a guard time of a specific length may be disposed before and/or after the UL RS and/or the DL RS.

For example, if the UE disposes a guard time of $D_{TRP \to UE}$ before a DL signal received from the BS and a guard time of $D_{TRP \to UE}$ after a UL signal transmitted to the BS, the UL RS and the DL RS may be prevented from overlapping and orthogonality between the UL RS and the DL RS corresponding to the object of Proposal 1 may be maintained.

As another example, if the UE disposes a guard time of $2 \times D_{TRP \to UE}$ before a DL RS received from the BS or after a UL RS, the UL RS and the DL RS may be prevented from overlapping and orthogonality between the UL RS and the DL RS corresponding to the object of Proposal 1 may be maintained. In another example, if the BS disposes a guard time which is sufficient to cause asynchronization before the DL RS and/or after the UL RS only when the DL RS and the UL RS are asynchronized by a CP or longer, overlap between the UL RS and the DL RS may be avoided and orthogonality between the UL RS and the DL RS corresponding to the object of Proposal 1 may be maintained.

The foregoing proposals and embodiments focus on a scheme for measuring an interference channel caused by in-band emission after a Tx or Rx bandwidth is determined in duplexing flexibility with FDM manner. However, interference information of in-band emission measured by the above proposals and embodiments may be used for a TRP/UE to determine a DL/UL transmission direction in any sub-band later. Further, it is obvious that the interference information may be used in determining a guard band between sub-bands for DL/UL transmission. In addition, the interference information may be used in determining switching of a TDM or FDM mode of duplexing flexibility.

Prior information that may be related to interference from in-band emission to determine whether a transmission direction of each sub-band is changed and whether the magnitude of a guard band is changed may include a previously measured interference signal strength value (e.g., RSSI value information) from in-band emission, scheduling information including a DL/UL configuration of each sub-band, power control, an MCS level, etc. that may be exchanged between TRPs (e.g., using X2 interfaces or OTA signaling), and/or cross-link interference attenuation information based on geometry information between TRPs. In relation to the prior information, the following detailed proposals may be made.

Proposal 6

Information about previously measured interference from in-band emission may be used in determining whether the transmission direction of a sub-band is to be changed from DL to UL or from UL to DL. The information about interference from in-band emission may be transmitted as information to be considered in making the determination.

Further, the information about previously measured interference from in-band emission may be used in determining the size of a guard band between the transmission directions of sub-bands. The information about interference from in-band emission may be transmitted as information to be considered in making the determination.

In addition, the information about interference from in-band emission may be used in determining whether the FDM manner is to be changed to the TDM manner. The information about interference from in-band emission may be transmitted as information to be considered in making the determination. Alternatively, an MCS, a power level, etc. to be used for scheduling a UE may be determined based on the information about interference from in-band emission. For example, the TRP may use the information for DL transmission in an intended UL with a low MCS level and high power to a severely interfered UE.

Further, if the network uses full duplex, the information about interference from in-band emission may be used to determine a DL or UL direction for each UE. If puncturing is configured for UEs, the information may be used to increase power in a high interference situation. If interference is reflected in a CQI, this usage may be scheduled according to the CQI.

Proposal 6-1

If an RSSI value of interference from in-band emission and an RSSI value of cross-link interference from an adjacent TRP, as measured by a TRP, are equal to or greater than a specific threshold, the TRP may transmit, to the corresponding aggressor TRP, through an X2 interface, a restriction message indicating a change in the transmission direction of a specific sub-band from UL to DL or from DL to UL and/or information to be used at a time of changing the transmission direction of the specific sub-band from UL to DL or from DL to UL.

For example, in the case in which a baseline DL/UL configuration of a network is DL, the direction of a specific TRP is DL, and the direction of a sub-band for an adjacent TRP is changed from DL to UL in an FDM manner, then the direction-changed TRP becomes a victim TRP, and the other TRPs following the existing baseline DL/UL configuration become aggressor TRPs. Herein, the victim TRP may measure in-band emission interference along with cross-link interference from an aggressor TRP by the proposal and store the measured information (e.g., an RSSI value of cross-link interference from a specific aggressor TRP or an RSSI of aggregated cross-link interference from multiple aggressor TRPs). A predetermined time later, when changing the transmission direction of a specific sub-band from DL to UL in the FDM manner unlike the existing baseline DL/UL configuration, the victim TRP may determine whether to change the transmission direction from DL to UL based on the above-described measured information.

Proposal 7

Scheduling information including a DL/UL configuration, power control, an MCS level, etc. of each sub-band, which may be exchanged between TRPs, e.g., via an X2 interface, and geometry information between TRPs may be used in changing the transmission direction of a specific sub-band of a TRP, changing the size of a guard band, or changing the TDM or FDM mode of duplexing flexibility or may be transmitted as information to be considered in making the determination.

Along with features of in-band emission interference, features of cross-link interference may be determined by a DL/UL transmission direction of each sub-band in an adjacent TRP. That is, the features of cross-link interference may be determined by the position and power control of an aggressor TRP that has changed the transmission direction of a specific sub-band. In other words, it is apparent that, as the distance between the aggressor TRP and the victim TRP increases, the amount of cross-link interference decreases and, as the distance between the aggressor TRP and the victim TRP decreases, the amount of cross-link interference increases. Obviously, the amount of cross-link interference is directly proportional to the transmission power of the aggressor TRP.

In addition, the effect of cross-link interference on a receiver of the victim TRP may be changed by an MCS level during reception of the victim TRP. Therefore, the scheduling information including the DL/UL configuration, power control, MCS level, etc. of each sub-band may be used in predicting the amounts of in-band emission interference and cross-link interference or the effect of the interference on the receiver and determining whether to change the transmission direction of a specific sub-band, the size of a guard band, or the mode of duplexing flexibility to TDM or FDM in a TRP, or may be used as information to be considered in the prediction and determination.

Further, combination of the information described in Proposal 6 and Proposal 7 may be used in determining whether to change the transmission direction of a sub-band, the size of a guard band, or the mode of duplexing flexibility to TDM or FDM, or may be used as information to be considered in making the determination.

Proposal 8

Fallback may be performed after the transmission direction of a sub-band, the size of a guard band, or the TDM or FDM mode of duplexing flexibility is changed based on the information of the foregoing proposals.

The amount and effect of cross-link interference may be predicted based on information about previously measured RSSI values of cross-link interference and interference from in-band emission, scheduling information including a DL/UL configuration of each sub-band, power control, an MCS level, etc. that may be exchanged between TRPs (e.g., using X2 interfaces), and/or geometry information between TRPs. It may be determined based on the predicted amount and effect of cross-link interference whether to change the transmission direction of a specific sub-band, the size of a guard band, or the mode of duplexing flexibility to TDD or FDD in a TRP.

Further, when the transmission direction of a specific sub-band, the size of a guard band, or the TDD or FDD mode of duplexing flexibility is changed in the TRP, if the total sum of in-band emission interference and cross-link interference exceeds a threshold after the above information (information about previously measured RSSI values of cross-link interference and interference from in-band emission, scheduling information including a DL/UL configuration of each sub-band, power control, an MCS level, etc. that may be exchanged between TRPs (e.g., using X2 interfaces), and/or geometry information between TRPs) is received, or if complaint signaling is received from the victim TRP/UE due to the effect of interference, the TRP may recover the baseline DL/UL configuration by fallback of change of the transmission direction of the sub-band, the size of the guard band, and the TDD or FDD mode of duplexing flexibility.

According to an embodiment of the present invention, as a middle stage of a realistic evolution direction of FDR technology for simultaneously performing transmission and reception by an arbitrary wireless device in a single frequency transmission band, interference measurement and information acquisition can be efficiently performed in a flexible duplex wireless transmission scheme for allocating an existing allocated DL or UL band to UL or DL of different duplex.

Effects according to the present invention are not limited to what has been particularly described hereinabove and other advantages not described herein will be more clearly understood by persons skilled in the art from the following detailed description of the present invention.

A method of processing an interference signal caused by in-band emission when a BS operating in an FDR mode transmits and receives a signal in an FDM manner is industrially applicable to various wireless communication systems such as a 3GPP LTE/LTE-A system and a 5G communication system.

The embodiments described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment (or proposal) may be included in another embodiment and may be replaced with corresponding constructions of another embodiment. It will be obvious that claims that do not explicitly cite each other in the appended claims may be presented in combination as an exemplary embodiment of the present invention or included as a new claim by subsequent amendment after the application is filed.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description and all changes coming within the meaning and equivalency range of the appended claims are intended to be embraced therein.

What is claimed is:

1. A method for a base station transceiving signals for an in-band emission interference, the method comprising:
   transmitting, to a user equipment (UE), a downlink signal in a first resource of a flexible downlink subband of an uplink band,
   wherein the uplink band includes a flexible uplink subband, a guard subband, and the flexible downlink subband;
   receiving an uplink signal and a mirror-image signal, wherein the uplink signal is received from the UE in the flexible uplink subband of the uplink band, and the mirror-image signal is received in a second resource among the flexible uplink subband,
   wherein an uplink signal in the second resource among the flexible uplink subband is punctured based on a power value of the uplink signal being lower than a predetermined value,
   wherein the predetermined value is lower than a power value of a mirror-image signal in the second resource, and
   wherein the mirror-image signal in the second resource is an interference signal generated from the downlink signal in the first resource, and
   estimating a channel gain of the in-band emission interference using the mirror-image signal,
   wherein a size of the guard subband is determined based on the channel gain of the in-band emission interference.

2. The method of claim 1, further comprising:
   transmitting, to the UE, information about the mirror-image signal.

3. The method of claim 1, wherein the flexible downlink subband and the flexible uplink subband are configured in the uplink band and the flexible downlink subband is flexibly configured in the uplink band.

4. A method for a user equipment (UE) transceiving signals for an in-band emission interference, the method comprising:
   receiving, from a base station (BS), a downlink signal in a first resource of a flexible downlink subband of an uplink band,
   wherein the uplink band includes a flexible uplink subband, a guard subband, and the flexible downlink subband;

receiving, from the BS, control information instructing that an uplink signal in a second resource among the flexible uplink subband is punctured based on a power value of the uplink signal being lower than a predetermined value, wherein the predetermined value is lower than a power value of a mirror-image signal in the second resource among the flexible uplink subband, and wherein the mirror-image signal in the second resource is an interference signal generated from the downlink signal in the first resource;

receiving, from the BS, information on a channel gain of the in-band emission interference estimated by using the mirror-image signal, wherein a size of the guard subband is determined based on the channel gain of the in-band emission interference, and transmitting the uplink signal in the flexible uplink subband of the uplink band based on the control information.

5. The method of claim 4, wherein the flexible downlink subband and the flexible uplink subband are configured in the uplink band and the flexible downlink subband is flexibly configured in the uplink band.

6. A base station of a Full Duplex Radio (FDR) mode for transceiving signals for an in-band emission interference, the base station comprising:

a transceiver coupled to at least one processor, wherein the at least one processor is configured to:

transmit, to a user equipment (UE), a downlink signal in a first resource of a flexible downlink subband of an uplink band, wherein the uplink band includes a flexible uplink subband, a guard subband, and the flexible downlink subband, receive an uplink signal and a mirror-image signal, wherein the uplink signal is received from the UE in a flexible uplink subband of the uplink band, and the mirror-image signal is received in a second resource among the flexible uplink subband, wherein an uplink signal in a second resource among the flexible uplink subband is punctured based on a power value of the uplink signal being lower than a predetermined value, wherein the predetermined value is lower than a power value of a mirror-image signal in the second resource, and wherein the mirror-image signal in the second resource is an interference signal generated from the downlink signal in the first resource, and estimate a channel gain of the in-band emission interference using the mirror-image signal, and wherein a size of the guard subband is determined based on the channel gain of the in-band emission interference.

7. The base station of claim 6, wherein the at least one processor is configured to transmit, to the UE, information about the mirror-image signal.

8. The base station of claim 6, wherein the flexible downlink subband and the flexible uplink subband are configured in the uplink band and the flexible downlink subband is flexibly configured in the uplink band.

9. A user equipment (UE) for supporting transceiving signals for an in-band emission interference, the UE comprising:

a transceiver coupled to at least one processor, wherein the at least one processor configured to:

receive, from a base station (BS), a downlink signal in a first resource of a flexible downlink subband of an uplink band, wherein the FDM scheme includes a downlink band and the uplink band, and the uplink band includes a flexible uplink subband, a guard subband, and the flexible downlink subband, receive, from the BS, control information instructing that an uplink signal in a second resource among the flexible uplink subband is punctured based on a power value of the uplink signal being lower than a predetermined value, wherein the predetermined value is lower than a power value of a mirror-image signal in the second resource among the flexible uplink subband, and wherein the mirror-image signal in the second resource is an interference signal generated from the downlink signal in the first resource, receive, from the BS, information on a channel gain of the in-band emission interference estimated by using the mirror-image signal, wherein a size of the guard subband is determined based on the channel gain of the in-band emission interference, and transmit, to the BS, the uplink signal in the flexible uplink subband of the uplink band based on the control information.

10. The user equipment of claim 9, wherein the flexible downlink subband and the flexible uplink subband are configured in the uplink band and the flexible downlink subband is flexibly configured in the uplink band.

* * * * *